(12) United States Patent
Denk et al.

(10) Patent No.: US 6,874,007 B2
(45) Date of Patent: Mar. 29, 2005

(54) APPARATUS AND METHOD FOR REDUCING PRECISION OF DATA

(75) Inventors: Tracy C. Denk, Irvine, CA (US); Jeffrey S. Putnam, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 10/672,187

(22) Filed: Sep. 26, 2003

(65) Prior Publication Data

US 2004/0059768 A1 Mar. 25, 2004

Related U.S. Application Data

(62) Division of application No. 09/735,170, filed on Dec. 11, 2000.
(60) Provisional application No. 60/170,156, filed on Dec. 10, 1999.

(51) Int. Cl.$^7$ .................................................. G06F 7/38
(52) U.S. Cl. .................................... 708/550; 708/551
(58) Field of Search ................................. 708/550–551

(56) References Cited

U.S. PATENT DOCUMENTS

| | | |
|---|---|---|
| 4,965,668 A | 10/1990 | Abt et al. |
| 5,218,563 A | 6/1993 | Juri et al. |
| 5,282,155 A | 1/1994 | Jones |
| 5,329,475 A * | 7/1994 | Juri et al. .................... 708/551 |
| 5,463,570 A | 10/1995 | Nakata |
| 5,612,909 A | 3/1997 | Morrow |
| 5,729,481 A | 3/1998 | Schwarz |
| 5,930,159 A | 7/1999 | Wong |
| 5,974,540 A | 10/1999 | Morikawa et al. |
| 6,161,119 A | 12/2000 | Gabriel et al. |
| 6,493,738 B1 | 12/2002 | Yoshimi |
| 6,513,055 B1 | 1/2003 | Boran |

FOREIGN PATENT DOCUMENTS

| | | |
|---|---|---|
| DE | 1 085 699 B | 7/1960 |
| DE | 1 085 699 | 7/1960 |
| EP | 0 469 841 A1 | 2/1992 |
| GB | 2 077 008 A | 12/1981 |

* cited by examiner

Primary Examiner—Tan V. Mai
(74) Attorney, Agent, or Firm—Christie, Parker & Hale, LLP

(57) ABSTRACT

Methods and apparatus for reducing precision of an input signal, by comparing a portion of the input signal to a preselected threshold value, and determining a selectable bias responsive to the comparison. By combining a portion of the input signal with the selectable bias, a reduced precision signal, having minimized or eliminated rounding error, is generated. The selectable bias corresponds to a predetermined characteristic of one of bias, an error signal, the input datum, the reduced precision datum, and a combination thereof.

22 Claims, 18 Drawing Sheets

APPARATUS AND METHOD FOR REDUCING PRECISION OF DATA

CROSS-REFERENCE TO RELATED APPLICATION(S)

The present application is a divisional application of, and claims priority to and the benefit of, pending U.S. patent application Ser. No. 09/735,170 filed Dec. 11, 2000 which, in turn, claims priority to and the benefit of U.S. Provisional Patent Application Ser. No. 60/170,156, filed Dec. 10, 1999.

BACKGROUND OF THE INVENTION

The implementation of DSP algorithms in VLSI requires trade-offs between factors such as algorithm performance, silicon area, power consumption, and clock frequency. One parameter that affects all of these factors is the word length, or number of bits, used to represent the data. Where extremely precise computations are required, floating point arithmetic may be needed. However, floating point operations can be impractical for high-speed applications, including digital signal processing (DSP), due to the added hardware, overhead, and processing time they demand.

By contrast, fixed point computations often are used when, such as in digital signal processing, extremely high processing rates are desirable. Typically, the word size used to represent a fixed point value is compact relative to floating point, and fixed point computational devices tend to be of simpler, efficient designs, which permit high-speed operation. Most DSP algorithms achieve satisfactory performance in VLSI using fixed-point arithmetic. Therefore, fixed point computations, particularly in the two's complement binary format, are predominant in DSP applications. However, because fixed point systems can only represent a fixed range of numbers, the internal data precision is reduced. In addition to the increased possibility of overflow during a calculation, fixed point operations tend to have a reduce ability to accurately quantize small numbers. Also, fixed point operations tend to require additional digits to represent the precision of the results of an operation. For example, a fixed point multiplication of two signal values, each having an initial precision of m bits, results in a product having 2m bits. Because the word length of a subsequent operation, or data path, may be limited to only m bits, some form of precision reduction is needed.

Therefore, rounding is desirable where data processing operations, including those involving, for example, binary- and decimal-based operations, generate an undesirably large number of digits of precision, and some form of precision reduction is needed. Precision reduction in fixed point operations comes at a price. For many DSP systems, performance metrics such as signal-to-noise ratio (SNR) and stability are adversely affected by decreasing internal data precision.

When the precision of a signal value is reduced, the difference between input and output values represents an error that is approximately equal to the part of the input signal that is discarded. In general, the statistics of the error can depend upon how the last bit of the output value is determined. Many DSP components, such as digital filters, can be represented by coefficient values related to a characteristic polynomial equation, which is representative of the component's operating characteristics, e.g. a digital filter's transfer function equation. Because the filter coefficients must be represented by finite length values, the behavior of the filter can be greatly influenced by precision reduction errors.

During the processing of a signal, and as the coefficients are updated, precision reduction can introduce errors roughly equivalent to the value of the dropped digits, or loss bits, thereby generating a precision reduction error signal. Signal processing typically involves numerous, sequential, iterative and recursive computations, during which uncompensated precision reduction errors accumulate, thereby degrading filter performance, possibly to the point of filter instability.

Many DSP applications include VLSI components that extensively employ high-speed computations which are susceptible to precision reduction errors. In widely-used adaptive filters and systems, the associated adaption components can be very sensitive to how data precision is reduced. In some instances, precision reduction errors are merely nuisances with little practical impact. However, in the extreme, precision reduction errors can lead to disastrous outcomes, such as in the documented failure of a defensive missile battery during the 1991 Persian Gulf War, which resulted in many lost lives. Because DSP applications are pervasive in modern life, including for example, communications, health care, transportation, defense, and the like, degraded system performance arising from uncompensated precision reduction errors can be of great import. Whether the application is aircraft navigation, critical-care life support, electronic commerce, or global communications, it is imperative that the DSP infrastructure supporting the application operate in a reliable and robust manner to the greatest extent possible.

What is needed, then, are methods and apparatus that substantially eliminate or offset the precision reduction error.

SUMMARY OF THE INVENTION

The present invention satisfies the above needs by providing methods and apparatus for reducing precision of an input signal having a precision portion and a loss portion, by comparing the loss portion to a preselected threshold value, $f_t$; determining a selectable bias, $\alpha$, responsive to the comparison of the loss portion, to the preselected threshold value, $f_t$; and combining the precision portion with $\alpha$, thus creating a reduced precision datum. Selectable bias $\alpha$ corresponds to a predetermined characteristic of one of $\alpha$, the input datum, the reduced precision datum, and a combination thereof. In preferred embodiments of the invention, selectable bias $\alpha$ is generated such that the Expected Value of selectable bias $\alpha$ is substantially equal to the Expected Value of the error signal between the input data with higher precision and an output signal with lesser precision. In this manner, errors due to rounding are minimized or eliminated.

BRIEF DESCRIPTION OF THE DRAWINGS

These and other features, aspects and advantages of the present invention will be more fully understood when considered with respect to the following detailed description, appended claims and accompanying drawings, wherein:

DETAILED DESCRIPTION OF THE INVENTION

The present invention includes methods and apparatus that reduce the precision of an input signal value having a first precision to an output signal having a second, lesser precision in a manner that greatly reduces, or substantially cancels, a precision reduction error signal typically inherent in prior art rounding techniques. By combining the input signal with a selectable bias, responsive to a preselected threshold rounding state, the rounding methods and apparatus according to the present invention provide an output signal that is substantially free of precision reduction error bias. In addition, where it is desired to produce a preselected signal offset, values for the selectable bias can be assigned to generate the offset. Such a signal offset may be useful to compensate for a undesirable pre-existing input signal bias, including correcting for precision reduction error biases injected during previous precision reduction operations. Also, it may be useful to impart an offset to an output signal, for example, to pre-condition the output signal for an anticipated bias arising from subsequent signal processing or in a communication channel.

As used herein, the term "selectable bias rounding" (SBR) will be used with reference to the embodiments of the present invention. SBR can be used alone, or in conjunction with traditional hardware and software, to manage, or substantially eliminate, the deleterious effects of accumulated round-off error.

Figure 1:
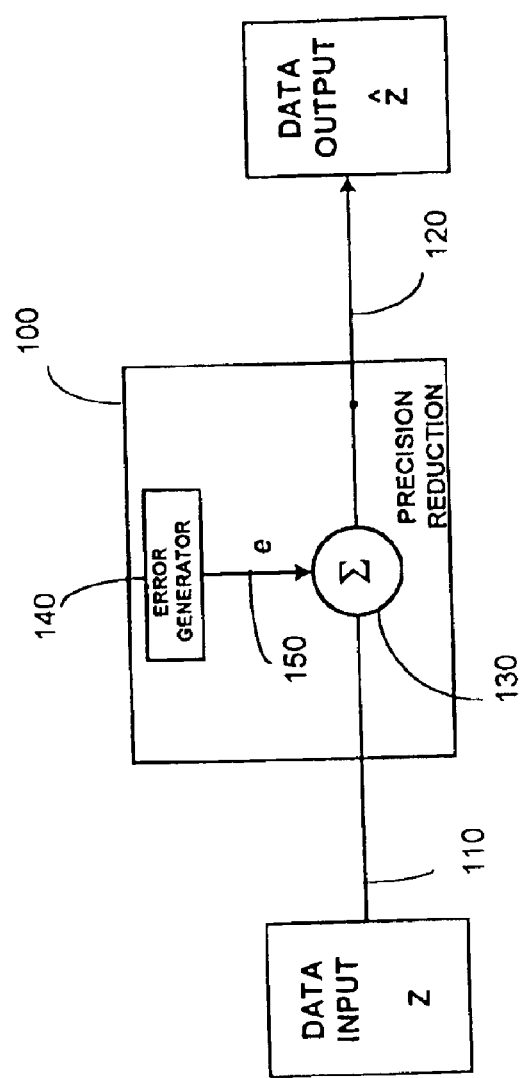
FIG. 1 is a signal flow representation of a precision reduction processor.

FIG. 1 illustrates a precision reduction processor 100, which receives input signal Z 110. Error generator 140 produces a precision reduction error signal 150 which, when combined with input signal 110 in summer 130, creates reduced precision output signal, $\hat{Z}$ 120. Precision reduction error 150 can contain both a component related to the extent of precision reduction and, typically, a component related to the rounding technique used. Symbolically, processor 120 can be represented by the equation: $\hat{Z}=Z+e$. It is clear that precision reduction error e is a function of the difference between output signal $\hat{Z}$ and input signal Z. $e=\hat{Z}-Z$.

Therefore, SBR methods and apparatus that are targeted at managing precision reduction error e can be advantageously used to minimize, or substantially eliminate, certain forms of precision reduction errors, thus allow DSP applications to operate more robustly and reliably.

The present invention is not limited to digital signal processing applications, or even to an electronic milieu. Indeed, the SBR invention contemplates methods and apparatus that may be used wherever it is desirable to manage error that may result when reducing the precision of a datum, that is representative of any physical entity. Also, although the SBR methods and apparatus described herein are discussed in the context of signed and unsigned decimal and binary data representations, the present invention can be applied to other data representation formats, and their complements, as will become apparent to those of ordinary skill in the art. Moreover, the present invention can be applicable to any precision reduction errors, whether or not the errors are categorized as "quantization," "truncation," or "rounding" errors, or a hybrid thereof. Thus, SBR rounding methods and apparatus are useful to minimize errors which may arise when, for example, a finite-valued datum is transformed from a representation having greater precision to one of lesser precision (e.g., 5.251 volts to 5 volts), or when a continuous-valued datum is approximated by a corresponding a finite-valued datum (e.g., an analog datum to a digital datum).

Finally, the principles of the present invention are illustrated by exemplary signals (e.g., X, $\hat{X}$, Y, $\hat{Y}$, Z, and $\hat{Z}$) which may represent an individual signal sample; or a discrete time sequence of signal samples, having a corresponding time index. For example, input signal Z, and output signal $\hat{Z}$, in FIG. 1 can be described by the canonical form $Z(j)$ and $\hat{Z}(j)$, where j is representative of the time index for a particular signal datum. But, for simplicity, time indices such as j will be dropped. A skilled artisan can discern when the discussion of the exemplary signals relates to an individual signal sample, or datum; or to a discrete time sequence of signal samples. Although an SBR rounding operation can described with regard to reducing the precision of an individual datum, or signal sample, it is understood that references to statistical characteristics, e.g., the signal Expected Value, or Mean, Variance, and the like, are to be interpreted in the context of a stochastic process of random variables, i.e., a signal that is defined by a time sequence of signal samples that are random variables, of which a particular datum is but a part.

Before elaborating upon the nature of selectable bias rounding techniques and devices, it is useful to illustrate the various concepts and terms related to "rounding," as used herein. In general, there are five methods of rounding:

(1) Round-to-zero (RTZ);
(2) Round-to-nearest (RTN);
(3) Round-to-floor (RTF);
(4) Round-to-ceiling (RTC); and
(5) Round-to-even (RTE).

Each type of rounding tends to introduce some form of precision reduction error. RTZ rounding tends to introduce a cumulative downward error bias for positive signal values, and a cumulative upper error bias for negative signal values, i.e., the magnitude of a signal value decreases. RTN rounding drives the signal value to the nearest representable value. Although the bias introduced in RTN rounding tends to be modest in comparison with other modes of rounding, nevertheless significant rounding errors can accumulate to produce undesirable results. Using RTF rounding, both positive and negative signal values are rounded towards negative infinity, introducing a negative cumulative error bias into the signal. On the other hand, RTC rounding rounds both positive and negative signal values towards positive infinity, and a positive cumulative error bias is introduced into the signal. RTC is often used when rounding values which lie precisely half-way between two desired quantities, e.g., rounding 3.50 to 4, or −3.50 to −3.) Finally, RTE rounding involves rounding to the nearest even binary value. A method employed by the floating point format specified by IEEE Standard 754-1985 (International Standard IEC 559), the RTE rounding mode adds the least significant bit (LSB) of the reduced precision signal value itself, when the "halfway" value exists, i.e., when the rounding digit following the LSB is non-zero, and the extended precision result has a non-zero digit in any digit location of the extended precision fields. As a result, the LSB of the rounded value is always 0, an even value.

Truncation is an operation that is conceptually consistent with RTZ rounding, in that, by dropping the undesired digits, the resulting value is brought closer to zero. For example, dropping the last two digits of −3.50 produces a valve of −3. However, for cases involving certain data representations, including negative numbers in two's complement format, truncation effects the opposite result, i.e., RTF rounding. For example, dropping the last two digits of $100.10_2^-$ (i.e., −3.5) produces $100_2^-$ (i.e., −3.0). Thus, truncation of two's complement signal values also tends to introduce a negative cumulative error bias into the signal. In view of this disparity, the term of "truncation" will be replaced by the term for the appropriate rounding operation wherever possible. Indeed, the term "precision reduction" is generally used to include "truncation," "rounding," as well as "quantization" or any other techniques that tend to reduce the precision of a datum.

Figure 2A:
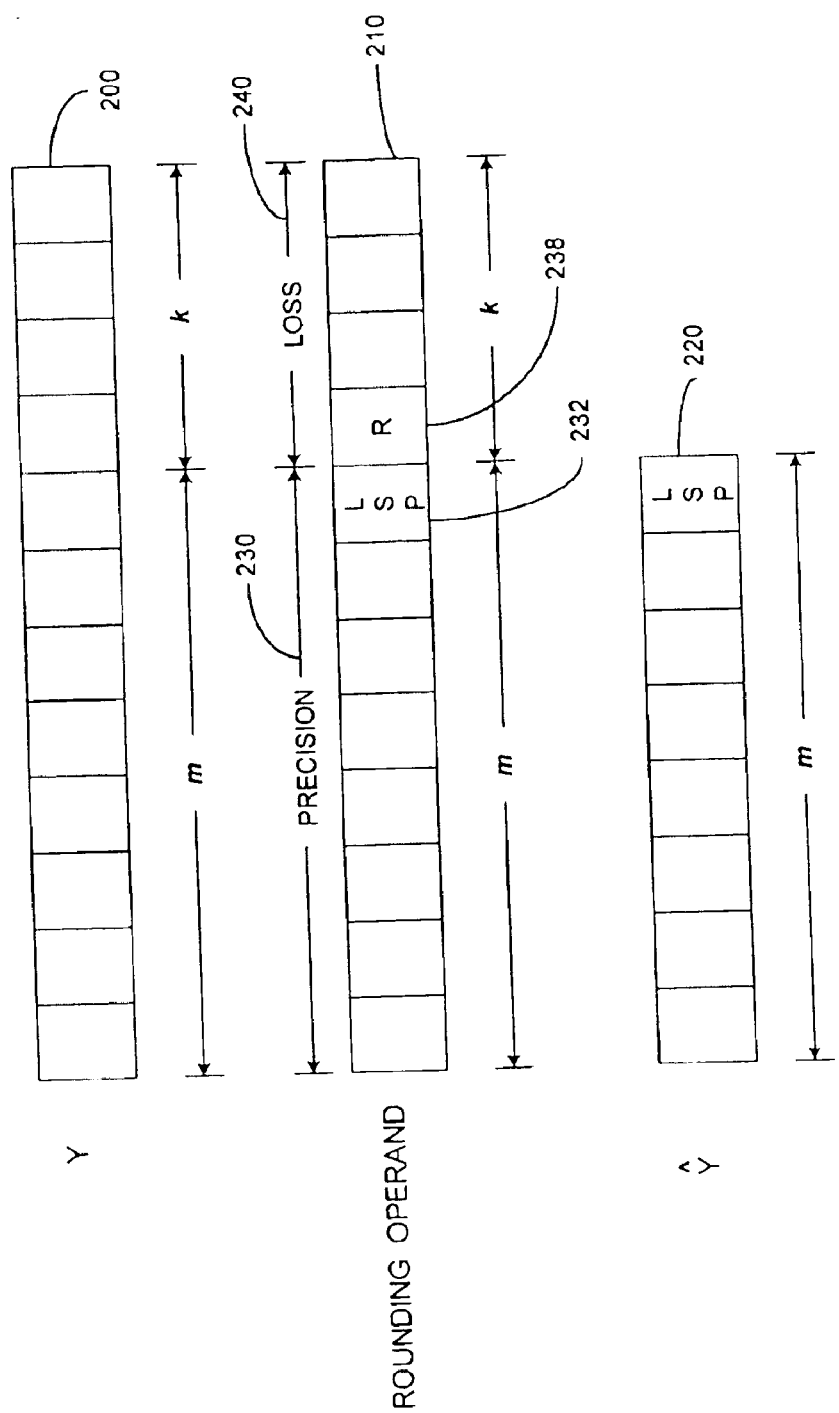
FIG. 2A is a first depiction of general data structures representative of the precision reduction.

FIG. 2A depicts an exemplary conceptual framework for illustrating a typical rounding operation. Input signal Y 200, is stored in a rounding operand 210 during the precision reduction operation. At the conclusion of the operation, operand 210 holds the value of output signal Ŷ. Input signal Y 200, having m+k digits, is received by rounding operand 210 for processing. In this example, it is desired to reduce input signal Y 200 to output signal Ŷ 220 having m digits, by performing a precision reduction operation on the value held by rounding operand 210. As defined herein, the rounding operand includes a precision portion 230, composed of m precision digits, followed by a loss portion 240 composed of k loss digits. The $m^{th}$ precision digit is the least significant precision (LSP) digit 232 of precision portion 230, and the (m+1) digit is rounding digit 242, which is the most significant digit of the loss portion 240. "Rounding point" 235, which may or may not represent the radix point of the value rounding operand 210, lies between (LSP) digit 232 and rounding digit 238. After the completion of the rounding operation, loss portion 240 is eliminated, leaving a signal having m precision digits. If rounding point 235 coincides with the radix point for that value, then the resultant reduced precision output signal value is an integer; otherwise, the output signal value also contains a fractional value and is real-valued. The value held in rounding digit 235 can indicate that a threshold rounding state potentially exists. One preferred threshold rounding state would include the presence of a "half-value" in the loss portion. Whether the threshold rounding state actually exists is determined by examining the values of all k loss digits. For example, in a decimal-oriented embodiment of the present invention, the corresponding "half-value" in the rounding digit 235 may be 510. Under this scenario, if all digits subsequent to the rounding digit 235 were zero-valued, then the threshold rounding state would exist. Similarly, in a binary implementation, if the rounding bit 235 holds a binary '1' value, then the subsequent loss bits must be evaluated. If all of the subsequent loss bits hold a zero value, then a threshold rounding state exists. If any of the loss bits subsequent to the rounding bit 235 is non-zero, then the threshold rounding state does not exist. The existence of the threshold rounding state can determine the type of rounding that will be employed to generate Ŷ. Typically, RTC rounding is used in prior art precision reduction operations resulting from a threshold rounding state. According to the present invention, it is preferred to combine a selectable bias value α with the input signal Y 200, to produce the reduced precision output signal Ŷ 220, upon the occurrence of a threshold rounding state, e.g., when loss portion 240 exactly represents a "half-value".

Figure 2B:
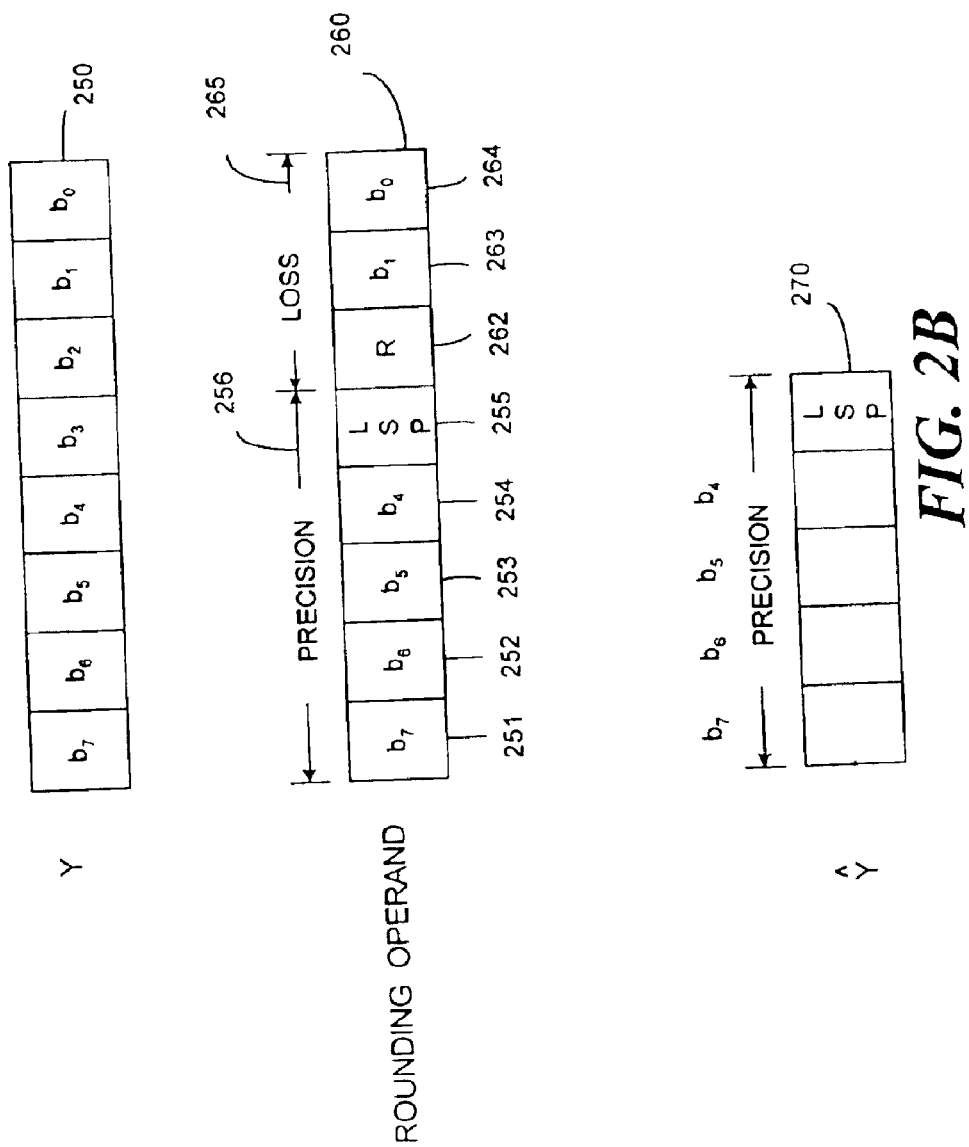
FIG. 2B is a second, more specific depiction of data structures representative of the precision reduction.

FIG. 2B further illustrates the aforementioned rounding principles by depicting exemplary 8-bit binary input signal Y 250, rounding operand 260, and exemplary reduced precision 5-bit binary output signal Ŷ 270. In this illustration, bits $b_7$ through $b_3$ (251–255) represent the precision portion 256 of Y 250, and $b_2$ through $b_0$ (262–264) represent the loss portion 265. Furthermore, the rounding point is between $b_3$ 255, the LSP bit of the precision portion 256, and $b_2$ 262 which is the rounding bit. If $b_2$ 262 holds a non-zero value, for example, the potential for a threshold rounding state exists, and the values held in $b_1$ 263 and $b_0$ 264 are examined to verify the presence of the threshold rounding state. According to certain binary-oriented embodiments of the present invention, if rounding bit $b_2$ 262 is "1," indicative of a "half-value," and if all of the subsequent bits, i.e., b1 263 and b0 264, are zero-valued, then the threshold rounding state exists. On the basis of loss portion 265, the desired method of rounding can be chosen and implemented.

Figure 3:
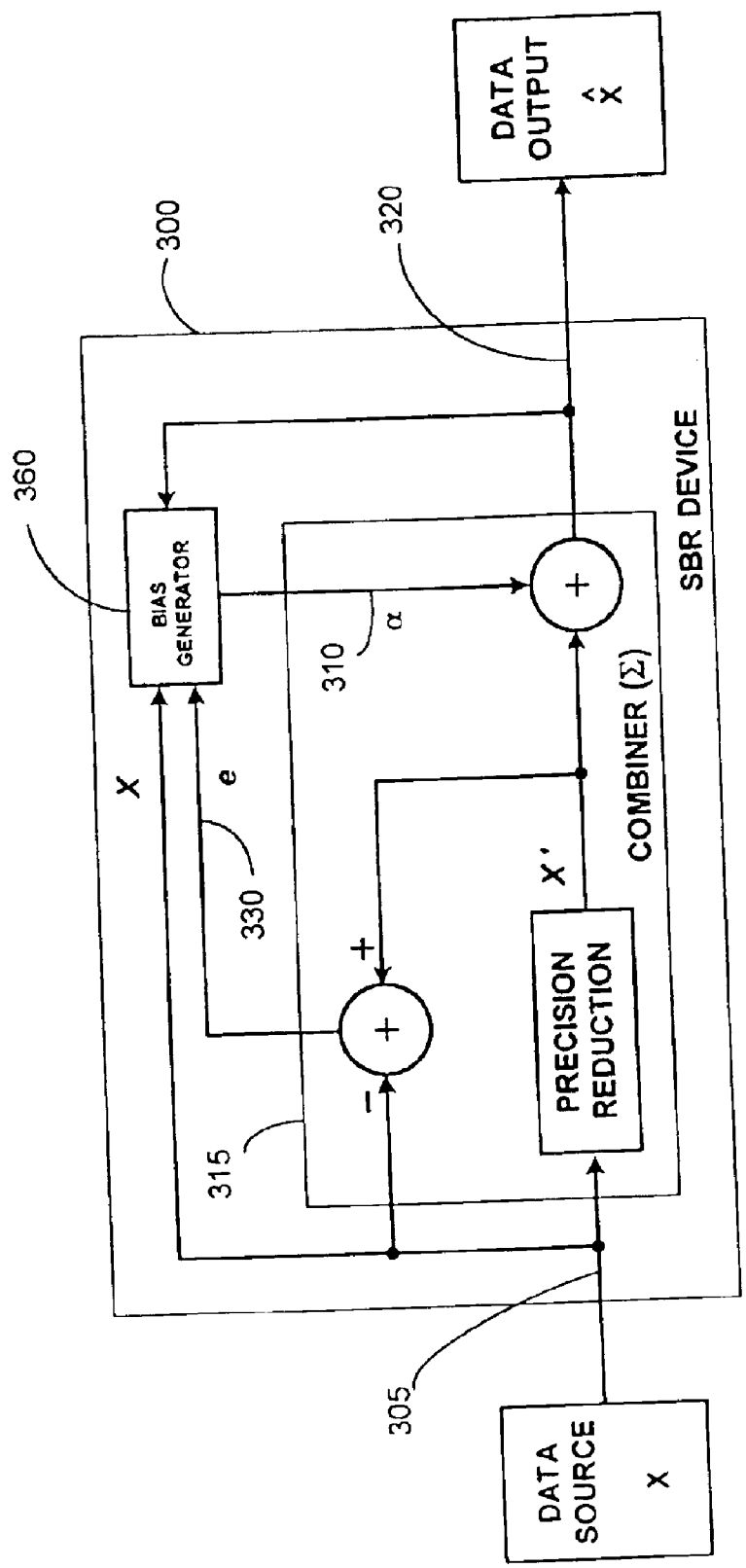
FIG. 3 is a first signal flow representation of one embodiment of a selective bias rounding device, illustrating general principles of operation according to the invention herein.

In FIG. 3, selectable bias rounding method 300 encompasses a preselected precision reduction method in which a selectable bias α 310 is combined by summer 315 with input signal X 305, having a first precision, to produce output signal X̂ 320 having a second, lesser precision. SBR method 300 has a precision reduction error signal, e 330, associated therewith, which could corrupt output signal X̂ 320 except that values of bias α 310 are chosen to cancel the effect of error signal e 330. Error signal e 330 can include a component related to the extent to which the precision is being reduced (e.g., 24 bits signal reduced to 8 bits signal), and a component due to the particular precision reduction technique that is employed (e.g., RTZ, RTN, RTC, RTF, RTE). Bias α 310 can be selected to cancel the effects if both components. For example, certain SBR techniques are designed to obviate the development of the latter bias, for example, by using alternating rounding. The value of the selectable bias α 310 is chosen to be responsive to a preselected characteristic of input signal X 305, the output signal $\hat{X}$ 320, the error signal e 330, values of α 310 itself, or combinations thereof. Selectable bias α 310 is preferred to be applied when input signal X 305 manifests a threshold rounding state, as represented by a preselected threshold value $f_t$ 350. When the threshold rounding state does not exist, prior art rounding techniques may be employed.

For example, in one embodiment of the inventive method herein, it is preferred to choose values for selectable bias α 310, corresponding to the Expected Values E(e)=E(α), when it is desired to substantially eliminate the precision reduction error signal e 330, typically associated with rounding in the instance of a "half-way" input signal value. That is, values for α 310 are generated such that, to the greatest extent possible, E(α)–E(e)=0. In addition to choosing values of α intended to substantially eliminate precision reduction error signal e 330, the values for α also can be selected to tailor the variance of α to be substantially equal to the variance of the precision reduction error signal, e 330, i.e., $\sigma_\alpha^2 = \sigma_e^2$.

In many cases where the signal values being rounded are random variables in a binary format, including, without limitation, fixed point two's complement binary values, E(e) is approximately equal to ½. Thus, it is preferred that α 310 be assigned values to effectuate an E(α) approximately equal to ½. One contemplated technique for realizing an E(α) approximately equal to ½, is to select values for a binary α 310, such that it is substantially equally probable that α='1' and α='0'. This can be accomplished using several approaches which utilize alternating '1' and '0' values for α 310. In one approach, E(α)=½ can be substantially achieved by assigning to α 310 binary values of '1' and '0' in a strictly alternating, or toggling, relationship. That is, each successive value of α 310 is either a '1' followed by a '0', or vice versa. In a second approach, E(α)=½ can be substantially achieved by assigning to α 310, binary values of '1' and '0' in an alternating relationship that employs a selected bit sequence. In a third approach, E(α)=½ can be substantially achieved by assigning to α 310 binary values of '1' and '0' in an alternating relationship that employs a pseudorandom bit sequence. Regardless of the approach selected, a skilled artisan would realize that the commonality among the several approaches is selecting values for α 319 to achieve E(α)=½, i.e., that α 310 is assigned both '1' and '0' binary values with substantially equal probability. The skilled artisan also would understand that, because RTC rounding is commonly used to effect rounding during the half-value threshold rounding state, a binary value of '1' is always added to the rounding operand, thus leading to an Expected Value of RTC rounding E(RTC)=1. In the circumstance where E(e)=½, clearly the commonplace RTC rounding can account for a significant amount of rounding error, where SBR rounding generally does not.

Moreover, values for selectable bias α 310 corresponding to an E(α)=v, can be chosen to supply a predefined offset value v in response to a predetermined characteristic other than the precision reduction error signal mean value, E(e), such as, for example, when it is desirable to impart a predefined offset v upon the output signal $\hat{X}$ 320, or, as another example, when it is desirable to negate a pre-existing offset having a mean value of –v that is present in input signal X 305. Also, values for selectable bias α 310 can be provided to substantially eliminate precision reduction error signal e 330, and supply a predefined offset value, v, contemporaneously. That is, selectable bias α 310 can be generated such that E(α) is substantially equal to E(e)+v. Furthermore, values for α 310 can be selected to respond to other predetermined characteristics of X 305, $\hat{X}$ 320, e 330, or α 310, as may be indicated by, for example, parametric analysis of the respective signals. A skilled artisan also will realize that the above techniques are not limited solely to signals represented by binary values, but can be used, mutatis mutandi, with values represented in other base systems, whether or not in complement, and in integer, fixed point, and floating point formats.

As used in the following examples and Figures, the value of input signal, X, can be represented by a generalized data format of $s_i$n.a, where $s_i$ signifies the sign or polarity of X; n signifies an integer part, or digit(s), of the value of X; "." signifies the radix point relevant to the value of X; and a signifies the fractional part, or digit(s), of the value of X. Similarly, the value of output signal, $\hat{X}$, can be represented a generalized data format of $s_o$n.b, where $s_o$ signifies the sign or polarity of $\hat{X}$; n signifies an integer part, or digit(s), of the value of $\hat{X}$; "." signifies the radix point relevant to the value of $\hat{X}$; and b signifies the fractional part, or digit(s), of the value of $\hat{X}$, with $0 \leq b < a$. A zero-valued a or b indicates that the respective signal has an integer value; a non-zero-valued a or b indicates that the respective signal is real-valued, with an integer part and a fractional part.

The following examples and Figures also will be characterized within the context associated with FIG. 2, as further characterized with a fixed point two's complement binary format. In these examples and Figures, input signal X, with a precision portion of(n+a+1) bits, provides the rounding operand. However, because it is desired that the reduced precision output signal $\hat{X}$ consist of(n+b+1) bits, the most significant (n+b+1) bits of the rounding operand are chosen to represent the precision portion, with the (n+b+1) bit being the least significant precision digit, and the final (a–b) bits being the loss portion. In this construct, the rounding point immediately follows the (n+b+1) bit, with the rounding bit being the (n+b+2) digit. When b=0, the rounding point coincides with the radix point, and $\hat{X}$ is rounded to an integer value. When b>0, the rounding point follows the $b^{th}$ bit, and the rounding bit is the $b^{th}$+1 bit. For each signal, both sign bits, respectively $s_i$ and $s_o$, a value of binary '0' is indicative of a signal with positive polarity and a value of binary '1' is indicative of a signal with negative polarity. In certain embodiments of the present invention, particularly those involving signals in the fixed point two's complement binary format, and more particularly, those in which positive and negative values are substantially equiprobable, it is preferred that the value of input signal sign bit, $s_i$, be assigned to selectable bias α when the threshold rounding state occurs.

Figure 4:
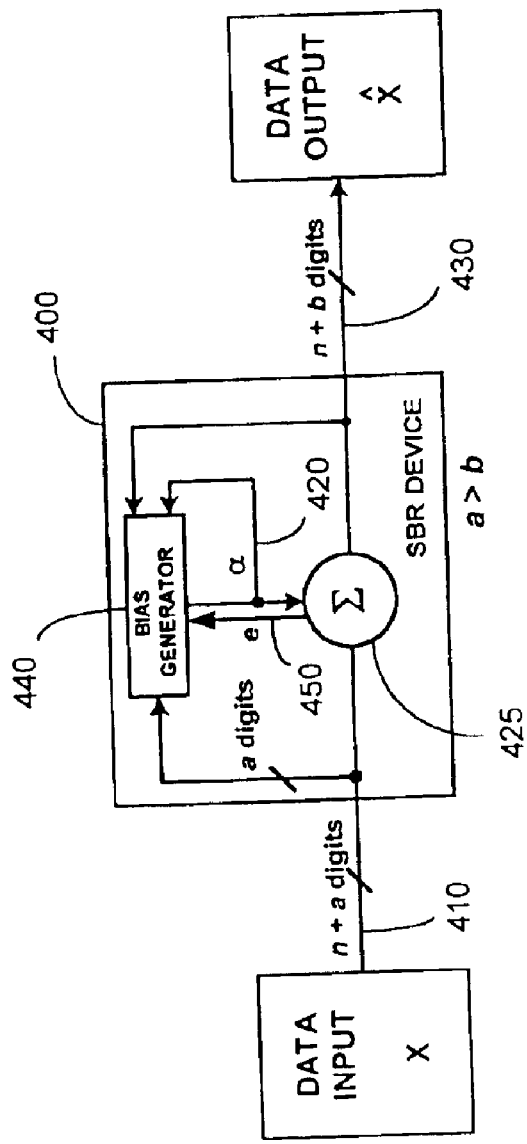
FIG. 4 is a second signal flow representation of another embodiment of a selective bias rounding device, illustrating more specific principles of operation according to the invention herein.

FIG. 4 shows an exemplary signal flow model of SBR device 400, which receives and combines input signal X 410 with selectable bias α 420, to produce output signal $\hat{X}$ 430. The value assigned to selectable bias α 420 is provided by selectable bias generator 440, with the value of α 420 being selected to minimize, or eliminate, the effect of error signal e 450. Without selectable bias generator 440 providing selectable bias α 420, FIG. 4 essentially reduces to model 100 of FIG. 1, in which an error signal e 150 develops as the difference between input signal 110 and output signal 120. To substantially counteract error signal 460 that would otherwise develop between input signal 410 and output signal 430, selectable bias generator 440 assigns values to selectable bias α 420, in response to predetermined characteristics of input signal X 410, output signal $\hat{X}$ 430, error signal e 460, values of selectable bias α 420, or combinations thereof.

In preferred embodiments of the invention, values of α 420 are chosen such that the Mean, or Expected Value, of α 420, i.e., E(α), is substantially equal to the Mean, or Expected Value, of error signal E(e) 460. Thus, by judiciously selecting values for α, 420 error signal e 460 can be substantially eliminated, i.e., E(e)−E(α)=0. Selectable bias generator 440 also can assign values to α 420 that create offset value v which can, for example, nullify an existing bias in input signal 410, or add a desired offset to output signal 430.

Figure 5:
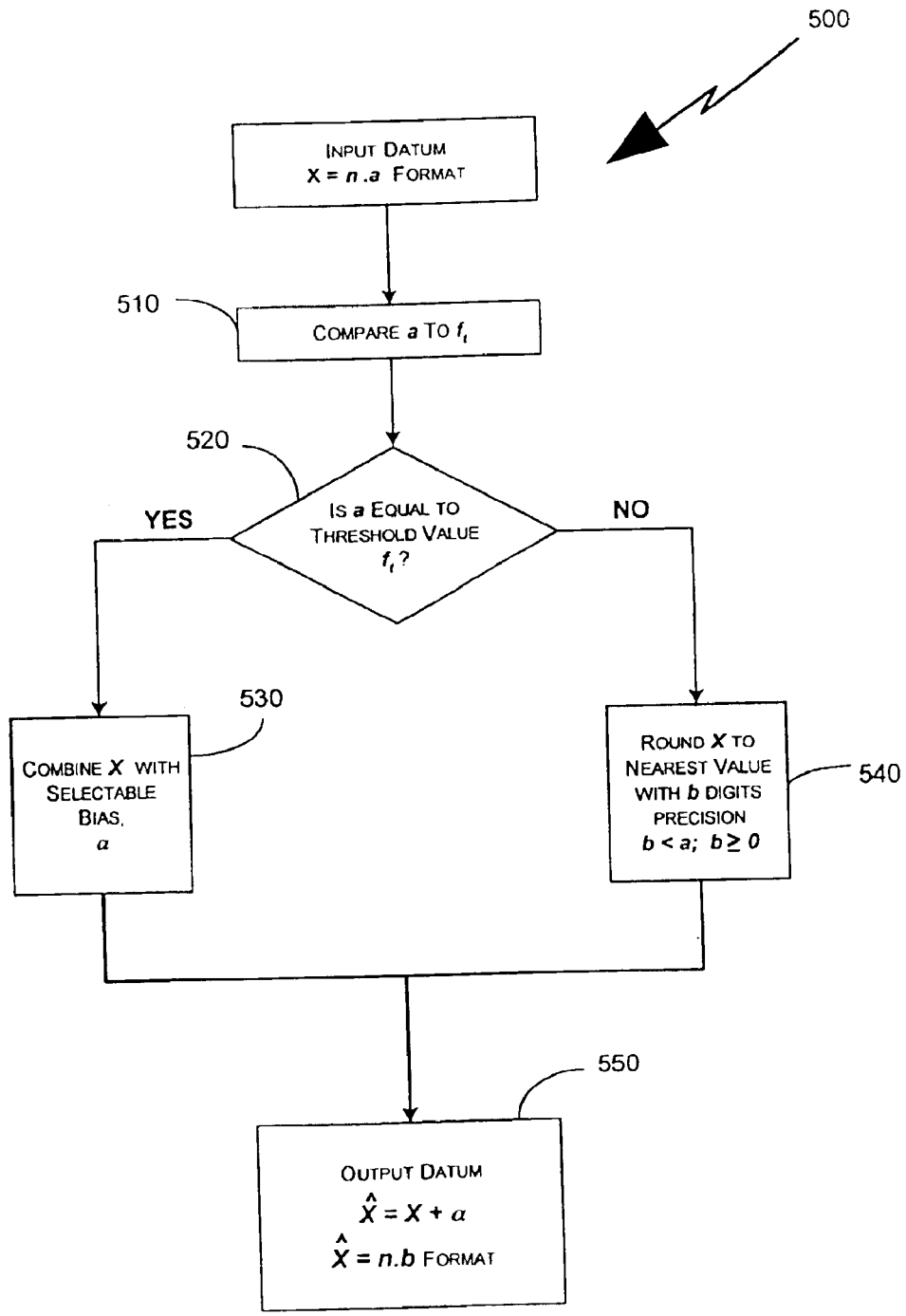
FIG. 5 is a first data flow diagram, illustrating one embodiment of the inventive methods herein.

FIG. 5 illustrates method 500, which is another preferred embodiment of the present invention. Initially, the rounding operand is assigned the value of unassigned input signal X with a digits precision, the operand is defined to have a precision portion and a loss portion, in a manner consistent with the reduced precision desired for output signal, X̂ with b digits precision. If a>b, then the precision portion of the operand is the first b digits, and the loss portion is the final a−b digits.

At the onset of the rounding operation, the loss portion is compared with a predetermined threshold value $f_t$, step 510, which value is representative of a threshold rounding state. Based upon that comparison, a rounding technique is selected, step 520, to adjust the value of the least significant precision bit (LSP) of precision portion 502.

If loss portion is substantially equal to predetermined threshold value $f_t$, then a selectable bias rounding technique is used, step 530, in which a selected value is assigned to α, responsive to a predetermined characteristic of one of the input signal X; the output signal X̂; the error signal e; the bias α itself; another preselected characteristic, which may be determined through parametric analysis of any of these signals; or a combination thereof. For example, it is be desirable to assign values to a such that E(α) is substantially equal to E(e). Once bias α is assigned a preselected value, it is combined with the rounding operand precision portion, step 535.

If the loss portion is not substantially equal to the predetermined threshold value $f_t$, other rounding techniques can be employed, including, for example, RTZ rounding, RTN rounding, RTF rounding, RTC rounding, and RTE rounding, step 540, alone or in combination. At the conclusion of the rounding operation, step 530 or step 540, the rounding operand precision is reduced to (n+b) bits by dropping the final (a−b) loss bits, step 550. The value of the rounding operand is now representative of reduced precision output signal, X̂, having (n+b) bits precision.

Figure 6:
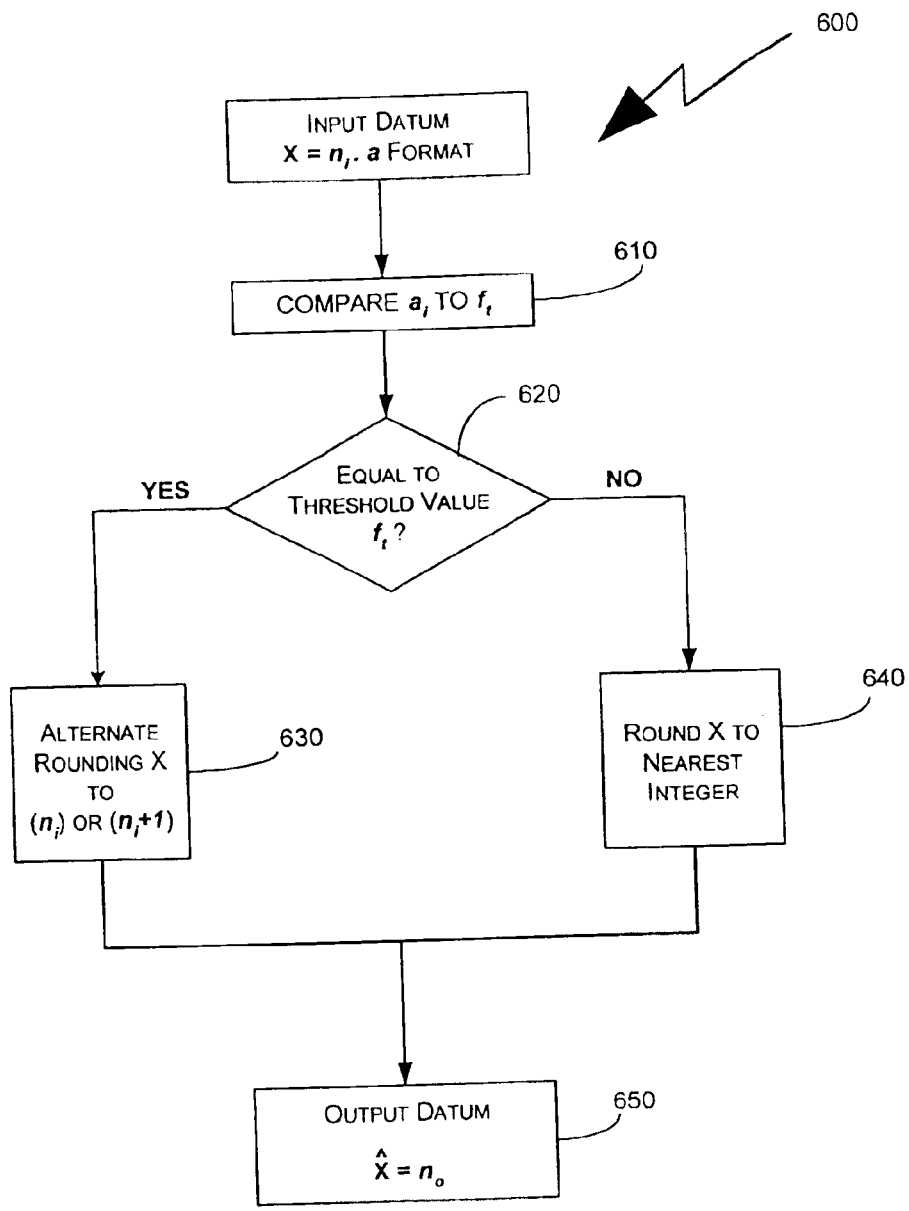
FIG. 6 is a second data flow diagram, illustrating another embodiment of the inventive methods herein.

FIG. 6 illustrates another embodiment of the present invention, which describes a method 600 intended to convert real-valued input signal X to a integer-valued reduced precision output value, X̂. Signal X is represented in n.a format by (n+a) digits, which are assigned to the rounding operand. In this example, it is desired to represent reduced precision output signal X̂ by n digits. Therefore, the most significant n digits of X constitute the precision portion of the rounding operand, with the remaining a digits being the loss portion.

At the onset of the rounding operation, the loss portion is compared with a predetermined threshold value $f_t$, step 610, which value is representative of a threshold rounding state. In this example, the threshold rounding state is a value half-way between two integers, and $f_t$ is assigned the value of $0.5_{10}$. Based upon that comparison, a rounding technique is selected, step 620, to adjust the value of the least significant precision bit.

If the loss portion is substantially equal to $0.5_{10}$, i.e., $f_t$, then selectable bias rounding, step 630, is used. In this example, it is preferred that one of two bias values be assigned to a namely, '1' and '0'. Next, the current value of α is combined with the least significant precision digit of the rounding operand to adjust the value of the operand precision portion, step 635.

The selectable bias value election is carried out such that a is assigned one value during one pass through step 630, and the other value during an immediately subsequent pass through step 630. The value alternation would continue with each subsequent iteration through step 630, so that the values for and during a series of sequential passes through step 630 would be represented by the sequence {1010 . . . 1}. Thus, the rounding operand precision portion is alternatingly rounded up and rounded down, or toggled, to the nearest integer values. In this case, the expected value of α, E(α), is substantially equal to $0.5_{10}$, over a temporal sequence of threshold rounding operations, where the Expected Value of the precision reduction error E(e) also is substantially equal to $0.5_{10}$. Thus, the error signal arising from the difference between X̂ and X is substantially zero.

Selectable bias rounding step 630 (alternating values) can be implemented in Verilog HDL in a manner similar to true rounding. The Verilog HDL (IEEE Std.1364) is a hardware description language used to design and document electronic systems, that is well-known to skilled artisans. In this implementation, it is preferred that selectable bias rounding to generate bit sequence for α having substantially zero mean. In one approach, α is inverted every time it is used. The following Verilog HDL code segment models this behavior using a flip-flop that toggles every time α is used.

```
wire x[7:0];
wire x hat[3:0];
wire toggle;
reg mu;
assign toggle=(x[3:0]++4'b1000);
assign x hat=x[7:4]+(toggle ? mu:x[3]);
always (posedge clock) mu<=reset n ? (toggle ?
    (~mu:mu)): 1'b0;
```

It is desirable to avoid overflow when performing the addition.

The Matlab® integrated technical computing environment can be used to model signal processing methods, and also is well known to skilled artisans. The Matlab® environment is produced by The MathWorks, Natick, Mass. Selectable bias rounding of step 730 can be modeled in the Matlab Environment by implementing standard rounding and then performing a correction.

The following Matlab® code can implement selectable bias rounding when α toggles between 0 and 1, where X is a vector of numbers in 1.a format, and X̂ is a vector of reduced-precision numbers in 1.b format.

```
x_hat=2^(-b)*floor(x*2^b+0.5);
need_correct=x_hat((x_hat-x)==2^(-(b+1)));
mu=zeros(size(correct));
mu(2:2:length(mu))=ones(size(mu(2:2:length(mu))));
x_hat((x_hat-x)==2^(-(b+1)))=x_hat((x_hat-x)==2^
    (b+1))-mu*2^(-b);
```

Instead of using toggled alternating values for selectable bias α, other values and value sequences also can be employed, so long as E(α) resulting therefrom is substantially equal to E(e). One preferred embodiment of an alternating sequence includes the use of a selected sequence of values, such as the exemplary sequence {111000 . . . 111}. Another preferred embodiment of an alternating sequence includes the use of a pseudorandom sequence of values, such as the exemplary pseudorandom sequence {0100001001111110}. In either case, the values assigned to α are chosen to produce E(α) substantially equal to E(e).

In a case where it is desirable to impose an offset v upon output signal $\hat{X}$, values of α may be selected such that E(α)=0.5+v. Because E(e)=$0.5_{10}$ in the scenario of method 600, E(e)−E(α)=v. For example, if it is desired to add an offset v approximately equal to $0.25_{10}$ to $\hat{X}$, then an alternating sequence represented by {1, 0, 0, 0, 1, 0, 0, 0, . . . , 1} could be used. Similarly, a value sequence represented by {0, 1, 1, 1, 0, 1, 1, 1, . . . , 0} could be assigned to α to add to $\hat{X}$ an offset v approximately equal to $0.75_{10}$. Furthermore, as before, values can be assigned to α in any selected sequence, or pseudorandom sequence, provided the desired values for E(α) are attained.

Continuing in method 600, if the loss portion of the rounding operand is not substantially equal to $0.5_{10}$, then existing rounding techniques can be employed, step 640, including, for example, RTZ rounding, RTN rounding, RTF rounding, RTC rounding, and RTE rounding, alone or in combination. Regarding the rounding technique employed at step 640, it is desirable to choose a technique that does not itself impose an undesirable error bias upon reduced precision output signal $\hat{X}$. At the conclusion of the rounding operation of step 630 or step 640, the rounding operand precision is reduced to n digits by dropping the least significant a loss digits, step 650. The value of the rounding operand is now representative of reduced precision output signal, $\hat{X}$, having n digits precision.

A skilled artisan would also realize that method 600 is suitable for implementation in other base environments, including binary. In a corresponding binary implementation, $f_t$ can be assigned the fractional value of (0.100 . . . 0.0), which also is representative of a half-value state, where E(e)=½. Thus, it would be preferred to assign values to the selectable bias such that E(α) is substantially equal to ½. Such values could be represented by the alternating value sequence represented by {1, 0, 1, 0, . . . , 1}.

Moreover, in view of the foregoing, a skilled artisan would appreciate that other value sequences can be used in the binary environment for selectable bias α including selected sequences and pseudorandom sequences; and that it also is possible to impose upon reduced precision output signal an offset value such as v, alone and responsive to a predetermined characteristic of, for example, input signal X, output signal $\hat{X}$, selectable bias α and the like.

Figure 7:
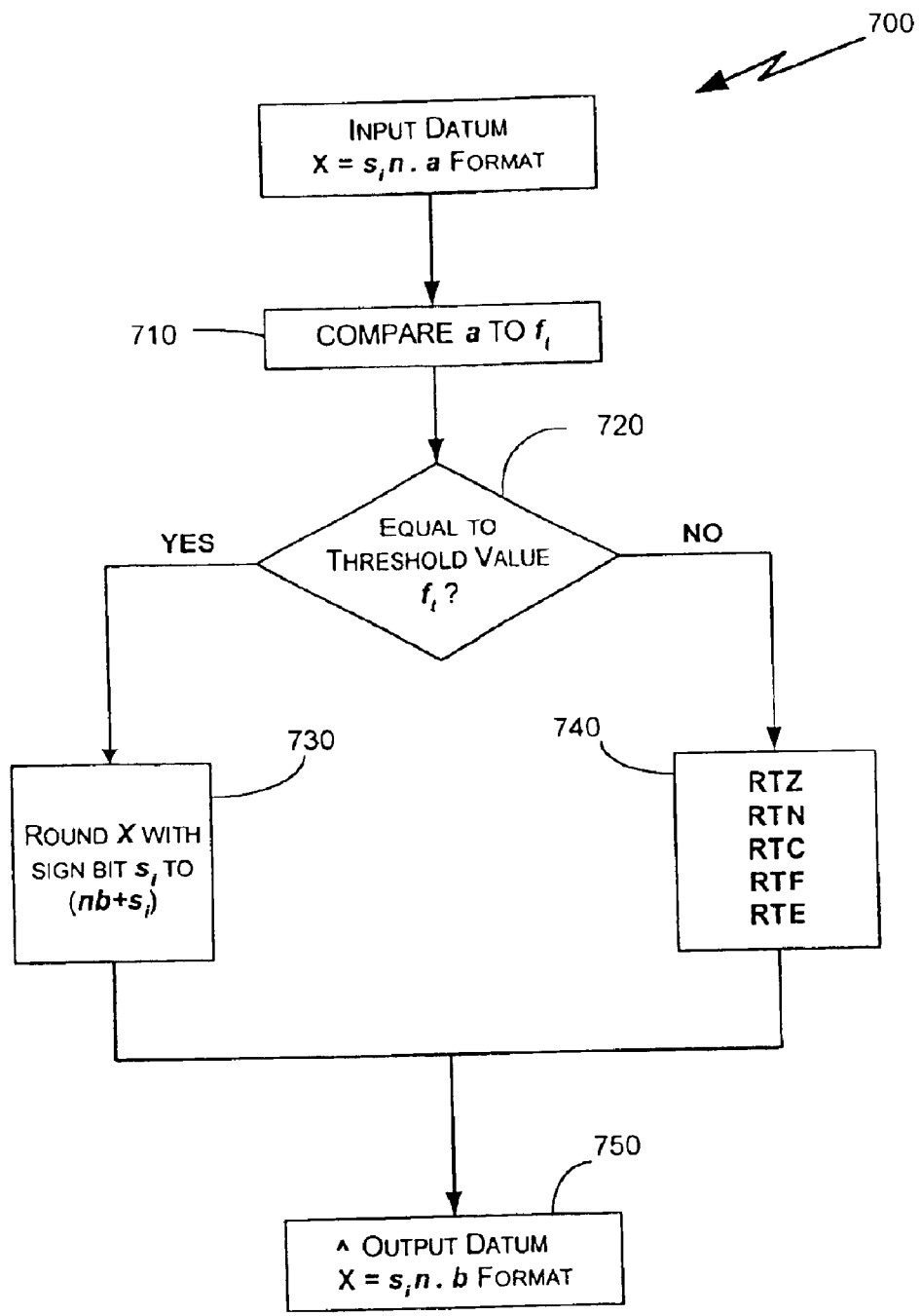
FIG. 7 is a third data flow diagram, illustrating yet another embodiment of the inventive methods herein.

FIG. 7 illustrates another embodiment of the present invention, which describes a method 700 intended to convert real-valued, fixed point two's complement binary input signal X to real-valued, fixed point two's complement binary reduced precision output signal $\hat{X}$. Signal X can be represented by (n+a+1) bits in $s_i$n.a format, with a fractional part of a bits. Signal $\hat{X}$ is represented by (n+b+1) bits in the $s_i$n.b format, with a fractional part of b bits, and, a>b. To begin, signal X is assigned to the rounding operand. In this example, the most significant n+b+1 bits of X constitute the precision portion of the rounding operand. The n+b+1 bit is the LSP bit, after which the rounding point is located. The remaining a−b bits are designated as the loss portion of the rounding operand. It may not be necessary, or desired, to include the sign bit in the determination of the number of precision bits and loss bits of the rounding operand. In this case, the rounding operand would initially be assigned (n+a) bits, of which only (n+b) bits are designated as the precision bits. As before, the least significant (a−b) bits of the rounding operand are designated as the loss bits. In either scenario, sign bit $s_i$ is not ignored, but is used in the determination of selectable bias α as shown below.

At the onset of the rounding operation, the loss portion is compared with a predetermined threshold value $f_t$, step 710, which value is representative of a threshold rounding state. In this example, the threshold rounding state is a value half-way between two real-valued binary numbers, and $f_t$ is assigned the value of (10 . . . $0_2$), i.e, a logical '1' followed by an unbroken series of logical '0'. Based upon the comparison in step 710, a rounding technique is selected, step 720, to adjust the value of the least significant precision bit of the rounding operand.

If the loss portion is substantially equal to (10 . . . 02), then selectable bias rounding, step 730, is used. In this example, it is preferred that the sign bit $s_i$ of X be assigned as the bias values. When X is a signal with positive polarity ($s_i$+), α is assigned the value of binary '0'; similarly, when X is a signal with negative polarity ($s_i$−), α is assigned the value of binary '1'. The technique associated with step 730 can be particularly desirable when X assumes positive and negative values with substantially equal probability. If subsequent values of X are alternately positive and negative values, then the assignment of values for α resembles the toggled alternating relationship described relative to FIGS. 5 and 6. In general, however, sign bit $s_i$ is a random variable and, thus, provided E($s_i$+)=E($s_i$−), E(α) will be substantially equal to E(e). That is, E(α)=E(e)=½. In this case, the assignment of values for α resembles the use of pseudo random sequence. Once α is assigned the value of $s_i$, the selectable bias α is combined with LSP bit of the rounding operand, step 735.

On the other hand, if the loss portion of the rounding operand is not substantially equal to $f_t$, then existing rounding techniques can be employed, step 740, including, for example, RTZ rounding, RTN rounding, RTF rounding, RTC rounding, and RTE rounding, alone or in combination. As before, it is desirable to choose a rounding technique at step 740, which does not itself impose an undesirable error bias upon reduced precision output signal $\hat{X}$.

At the conclusion of the rounding operation of step 730 or step 740, the rounding operand precision is reduced to (n+b+1) bits by dropping the least significant (a−b) loss bits, step 750. The value of the rounding operand is now representative of the signed, real-valued reduced precision output signal, $\hat{X}$, having (n+b+1) bits precision (or (n+b) bits precision, if the sign bit is not employed in the characterization of signal "precision.")

The following Verilog HDL code segment models the behavior of step 730. If the input X is known to be positive and negative with equal probability, then the sign $s_i$ of X can be used to create the zero-mean sequence of α as shown below.

wire x[7:0];
wire x hat[3:0];
wire alpha;
assign alpha=x[7];
assign x hat=x[7:4]+((x[3:0]==4'b1000) ? alpha:x[3]);

It is desirable to avoid overflow when performing the addition.

A skilled artisan would also realize that method 700 is suitable for implementation in other base environments, including decimal, particularly in complement formats in which the polarity of the values are represented by digits and where positive and negative numbers occur with equiprobability. Moreover, in view of the foregoing, a skilled artisan would appreciate that the foregoing step 730, i.e., assigning the value of $s_i$ to α can be used in conjunction with the selectable bias techniques described with regard to FIG. 5 and FIG. 6, for imparting a desired offset value v upon reduced precision output signal $\hat{X}$, step 760. The value of v can be independent of other signal parameters, or can be responsive to a predetermined characteristic of, for example, input signal X, output signal $\hat{X}$, selectable bias α and the like. Furthermore step 780 can be performed sequentially with step 730, or in tandem therewith.

Figure 8:
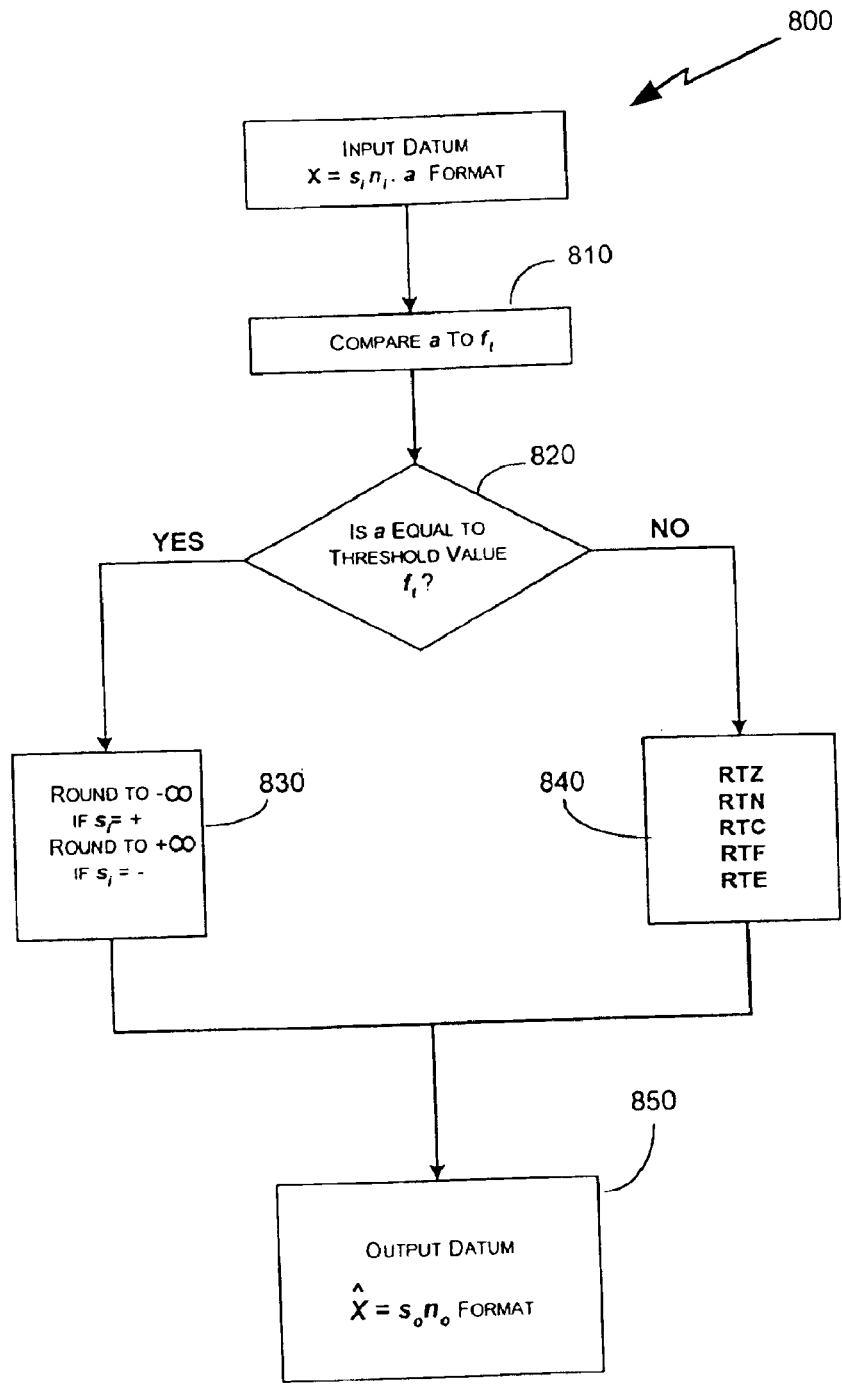
FIG. 8 is a fourth data flow diagram, illustrating still another embodiment of the inventive methods herein.

FIG. 8 illustrates another embodiment of the present invention, which describes a method 800 intended to convert a signed, real-valued input signal X to a signed, integer-valued reduced precision output value, $\hat{X}$. The value of signal X is represented in $s_i$n.a format by (n+a+1) digits, and is assigned to the rounding operand. In this example, it is desired to represent signal $\hat{X}$ by n digits. Therefore, the most significant n digits of X, i.e., the integer part, constitute the precision portion of the rounding operand, with the remaining a digits being the loss portion. Digit n is the LSP digit, after which is located the rounding point.

At the onset of the rounding operation, the value of the loss portion is compared with a predetermined threshold value $f_t$, step 810, which value is representative of a threshold rounding state. In this example, the threshold rounding state is chosen to be a value half-way between two integers, (k) and (k+1), and $f_t$ is assigned the value of $0.5_{10}$. Based upon that comparison, a rounding technique is selected, step 820, to adjust the value of the least significant precision bit.

If the loss portion is substantially equal to $0.5_{10}$, i.e., $f_t$, then selectable bias rounding, step 830, is used. In this example, it is preferred that, if $s_i$ is indicative of a positive number, then value of the selectable bias α is chosen to round the rounding operand towards negative infinity. On the other hand, if $s_i$ is indicative of a negative number, then it is preferred that the α is chosen to round the rounding operand towards positive infinity.

As with method 700, method 800 executes the selectable rounding step responsive to sign bit $s_i$. Indeed, when the signal values are represented in the two's complement format, the two methods are equivalent in effect because when $s_i$=1, i.e., X has negative polarity, a selectable bias value of '1' is combined with the least significant precision bit to adjust the value of the rounding operand, effectively rounding the value towards positive infinity. Similarly, when $s_i$=0, i.e., X has positive polarity, a selectable bias value of '0' is combined with the least significant precision bit to adjust the value of the rounding operand, effectively rounding the value towards negative infinity. The current value of α is then combined, step 835, with the least significant precision digit of the rounding operand to adjust the value of the operand precision portion.

As with method 700 at step 730, the technique associated with step 830 can be particularly desirable when X assumes positive and negative values with substantially equal probability. In each method, it is desired to assign values to the selectable bias α so that E(α) is substantially equal to E(e).

Continuing in method 800, if the loss portion of the rounding operand is not substantially equal to $f_t$, i.e., 0.510, then existing rounding techniques, can be employed, step 840, including, for example, RTZ rounding, RTN rounding, RTF rounding, RTC rounding, and RTE rounding, alone or in combination. Regarding the rounding technique employed at step 840, it may be desirable to choose a technique that does not itself impose an undesirable error bias upon reduced precision output signal $\hat{X}$.

At the conclusion of the rounding operation of step 830 or step 840, the rounding operand precision is reduced to n digits by dropping the least significant a loss digits, step 850. The value of the rounding operand is now representative of reduced precision output signal, $\hat{X}$, having $s_o$n digits precision.

Figure 9:
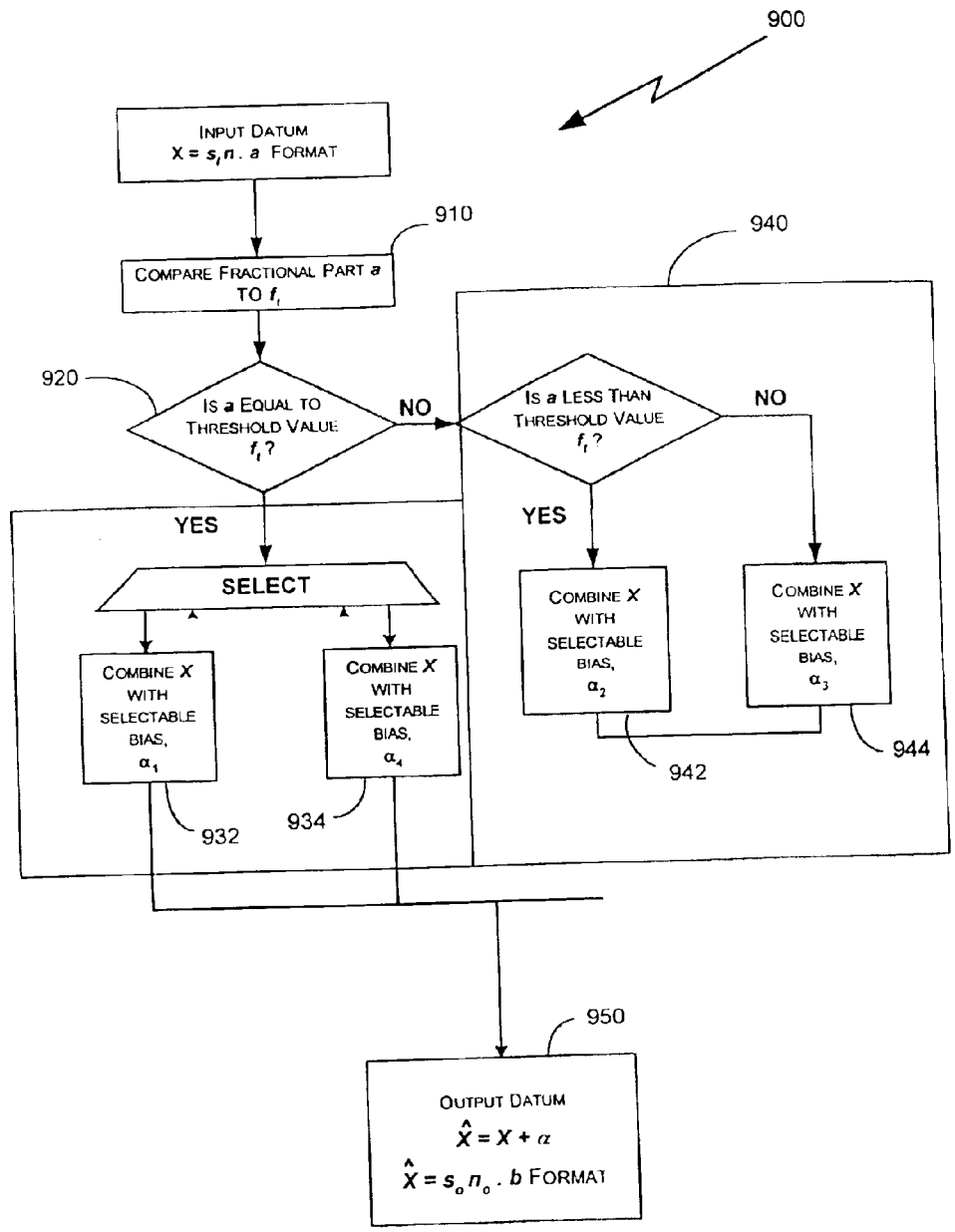
FIG. 9 is a fifth data flow diagram, illustrating a further embodiment of the inventive methods herein.

FIG. 9 illustrates another embodiment of the present invention, which describes a method 900 intended to convert real-valued fixed point two's complement binary input signal X to real-valued fixed point two's complement binary reduced precision output signal $\hat{X}$. Signal X is represented by (n+a+1) bits in $s_i$n.a format, with a fractional part of a bits. Signal $\hat{X}$ is represented by (n+b+1) bits in the $s_i$n.b format, with a fractional part of b bits, i.e., a>b. Signal X is assigned to the rounding operand. In this example, the most significant (n+b+1) bits of X constitute the precision portion of the rounding operand. The (n+b+1) bit is the least significant precision bit, after which the rounding point is located. The remaining (a–b) bits are designated as the loss portion of the rounding operand.

At the onset of the rounding operation, the loss portion is compared with a predetermined threshold value $f_t$, step 910, which value is representative of a threshold rounding state. In this example, the threshold rounding state is a value half-way between two real-valued binary numbers, and $f_t$ is assigned the value of $(10\ldots0_2)$, i.e., a logical '1' followed by an unbroken series of logical '0'. Based upon the comparison in step 910, a rounding technique is selected, step 920, to adjust the value of the least significant precision bit of the rounding operand.

If the loss portion is substantially equal to $(10\ldots0_2)$, then in this embodiment of the invention two (or more) selectable bias rounding techniques may be selected, step 930. In this example, two values, $α_1$ and $α_4$, may be chosen in the SBR steps 932, 934, for assignment to selectable bias α during successive iterations through step 930, in response to one or more predetermined characteristics of, for example, input signal X, output signal $\hat{X}$, the error signal e, selectable bias α, or a combination thereof. While at least one SBR method of the present invention is preferred to be included in step 930, e.g., at step 932, the other rounding technique, used in conjunction with the SBR method, e.g., step 934, can be a suitable prior art rounding method, if desired. As with methods 500, 600, 700 and 800, α is then combined, step 935, with the least significant precision bit of the rounding operand precision portion.

If the loss portion is not substantially equal to $(10\ldots0_2)$, then, unlike methods 500, 600, 700 and 800, step 940 also may employ SBR techniques according to the present invention, also if multiple selectable bias rounding techniques may be selected, step 930, also in response to one or more predetermined characteristics of, for example, input signal X, output signal $\hat{X}$, the error signal e, selectable bias α, or a combination thereof. In this example, two selectable bias values, $α_2$ and $α_3$ may be chosen in the SBR steps 942, 944, respectively, for the selectable bias α during successive iterations through step 940. While at least one SBR method of the present invention is preferred to be included in step 940, e.g., at step 942, the other rounding technique, e.g., step 944, can be a suitable prior art rounding method. Once a value for bias α is assigned, then it is combined, step 945, with the LSP bit of the rounding operand precision portion, as in step 935. At the conclusion of the rounding operation of step 935 or step 945, the rounding operand precision is reduced to (n+b+1) bits by dropping the least significant (a–b) loss bits, step 950. The value of the rounding operand is now representative of the real-valued reduced precision output signal, $\hat{X}$, having (n+b+1) bits precision.

Figure 10:
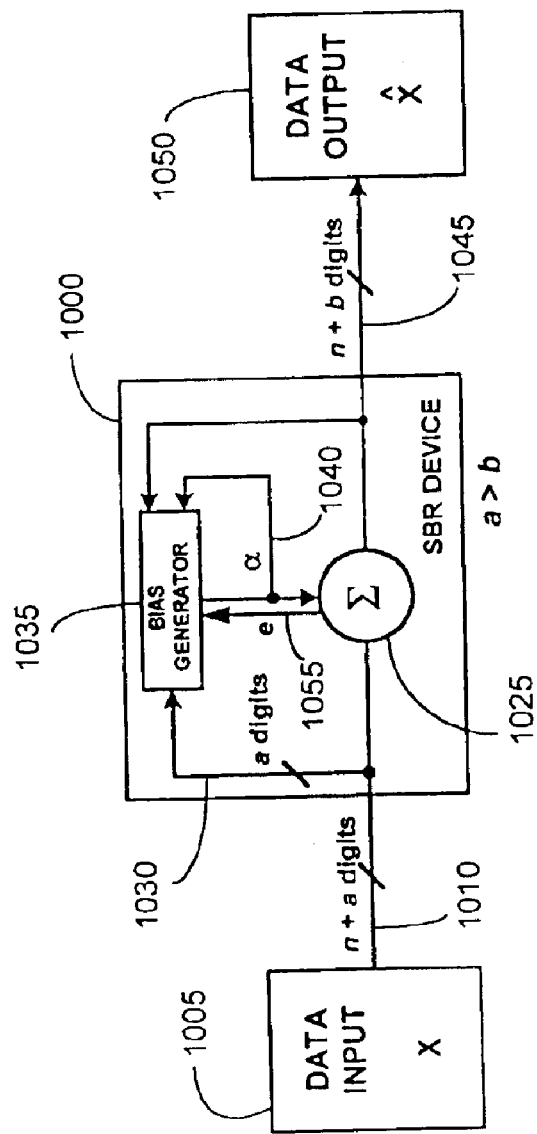
FIG. 10 is a third signal flow representation of one embodiment of a selective bias rounding device, according to the present invention, illustrating particular structures therein.

FIG. 10 illustrates an selectable bias rounding (SBR) device 1000 intended to reduce the precision of input signal 1010, from data input source 1005. Input signal X 1010 is represented in an n+a digit format, where n represents the number of integer digits in the value of X and a represents the digits of the fractional portion 1030 of X. For this example, it is desired to transform input signal X 1010 into output signal X̂ 1045, which is represented in an n+b digit format, where n represents the number of integer digits in the value of X̂ and b represents the digits of the fractional portion of X, where a>b. It is also desired to preset the threshold value $f_t$ within selectable bias generator 1035 to indicate a half-value state, which, in a binary implementation would be (10 . . . 0).

When signal 1010 is admitted to SBR device 1000, fractional portion a, is compared preselected threshold value $f_t$ within generator 1035, to determine whether a half-value threshold rounding state exists. If it does, then selectable bias α 1040 is combined with signal 1010 in combiner 1025 to adjust the LSP of output signal X̂ 1045. Combiner 1025 also drops the least significant (a–b) bits of signal X̂ 1045, which are representative of the loss portion of the signal. Device 1000 can use input signal X 1010, selectable bias α 1040, output signal X̂ 1045, or error signal e 1055, or a combination thereof, to generate values for selectable bias α 1040 that is responsive to a predetermined characteristic of at least one of the aforementioned signals. In a preferred embodiment of the invention, values for selectable bias α 1040 are responsive to the error signal e 1055.

Figure 11:
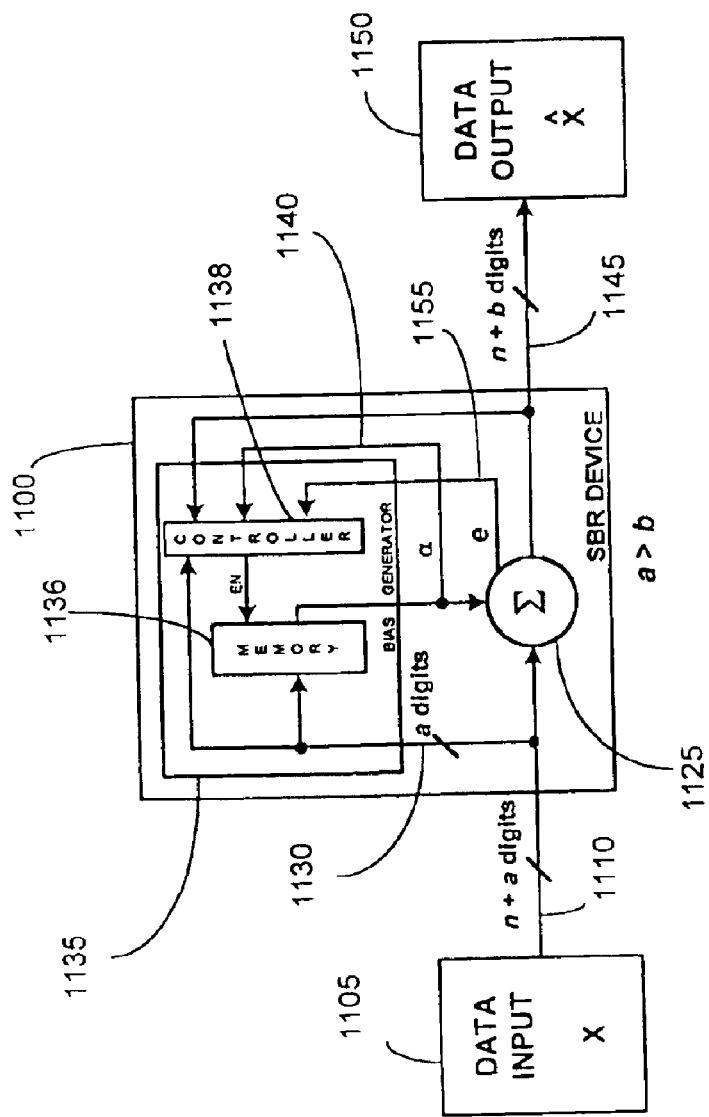
FIG. 11 is a fourth signal flow representation of another embodiment of a selective bias rounding device, according to the present invention, illustrating memory-based control of a selectable bias.

FIG. 11 illustrates an embodiment of SBR device 1100 having a particular implementation of bias generator 1135. As in FIG. 10, input signal X 1110 is produced by data source 1105, and received by SBR device 1100. Similar to FIG. 10, input signal X 1110 is represented in an n+a digit format, where n represents the number of integer digits in the value of X, and a represents the digits of the fractional portion 1130 of X. For this example, it is desired to transform input signal X 1110 into output signal X̂ 1145, which is represented in an n+b digit format, where n represents the number of integer digits in the value of X̂, and b represents the digits of the fractional portion of X, and where a>b. It is also desired to preset the threshold value $f_t$ within controller 1137 of selectable bias generator 1135 to indicate a half-value state, which, in a binary implementation would be (10 . . . 0).

When signal 1110 is admitted to SBR device 1100, fractional portion a 1130, is compared within controller 1137 to determine whether a half-value threshold rounding state exists. If it does, then controller 1137 enables memory 1138, and a selectable bias α 1140 is produced therefrom, responsive to a predetermined characteristic of one or more of signal X 1110, bias α 1140, signal X̂ 1145, and signal e 1155. Memory 1138 can be, for example, a RAM, a ROM, or a content addressable memory. A skilled artisan will realize that any functionally-equivalent storage device also would be suitable. Memory 1138 can be suitable for use where it is desired to provide particular values for bias α 1140, including selected sequences of alternating values and pseudorandom selectable bias sequences. Selectable bias α 1140, is combined with signal 1110 in combiner 1125 to adjust the least significant precision bit of output signal X̂ 1145. Combiner 1125 also drops the least significant (a–b) bits of signal X̂ 1145, which are representative of the loss portion of the signal. In a preferred embodiment of the invention, values for selectable bias α 1140 are responsive to the error signal e 1155.

Figure 12:
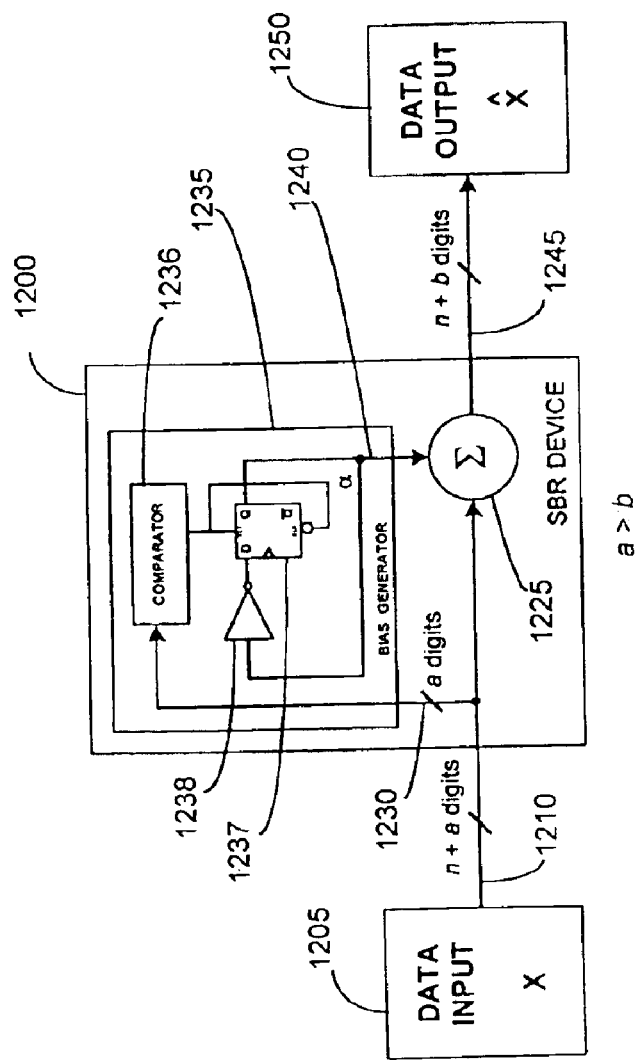
FIG. 12 is a fifth signal flow representation of yet another embodiment of a selective bias rounding device, according to the present invention, illustrating state-based control of a selectable bias.

FIG. 12 is yet another embodiment of SBR device 1200 having a particular implementation of bias generator 1235, which is adapted to produce a selectable bias α 1240 having values that alternate, in a toggle relationship, between binary '1' and binary '0'. Input signal X 1210 is produced by data source 1205, and received by SBR device 1200. Similar to FIG. 10 and FIG. 11, input signal X 1210 is represented in an n+a digit format, where n represents the number of integer digits in the value of X and a represents the digits of the fractional portion 1230 of X. For this example, it is desired to transform input signal X 1210 into output signal X̂ 1245, which is represented in an n+b digit format, where n represents the number of integer digits in the value of X̂ and b represents the digits of the fractional portion of X, where a>b. It is also desired to preset the threshold value $f_t$ within comparator 1236 of selectable bias generator 1235 to indicate the presence of a half-value state, which, in a binary implementation would be (10 . . . 0).

When signal 1210 is admitted to SBR device 1200, fractional portion a, is evaluated within comparator 1236 to determine whether a half-value threshold rounding state exists. If it does, then comparator 1236 enables flip-flop 1237, and a selectable bias α 1240 is produced therefrom. The present value of selectable bias α 1240 is complemented in inverter 1238 and fed back to the input of flip-flop 1237 to be used as the next value of selectable bias α 1240, when the next threshold rounding state is detected. In this manner, it is possible to implement, for example, the variant of step 630 in method 600 in which a strictly alternating sequence of binary '1' and binary '0' values constitutes successive values for selectable bias α 1240. Selectable bias α 1240, is then combined with signal 1210 in combiner 1225 to adjust the least significant precision bit of output signal X̂ 1245. Combiner 1225 also drops the least significant (a–b) bits of signal X̂ 1245, which are representative of the loss portion of the signal.

Figure 13:
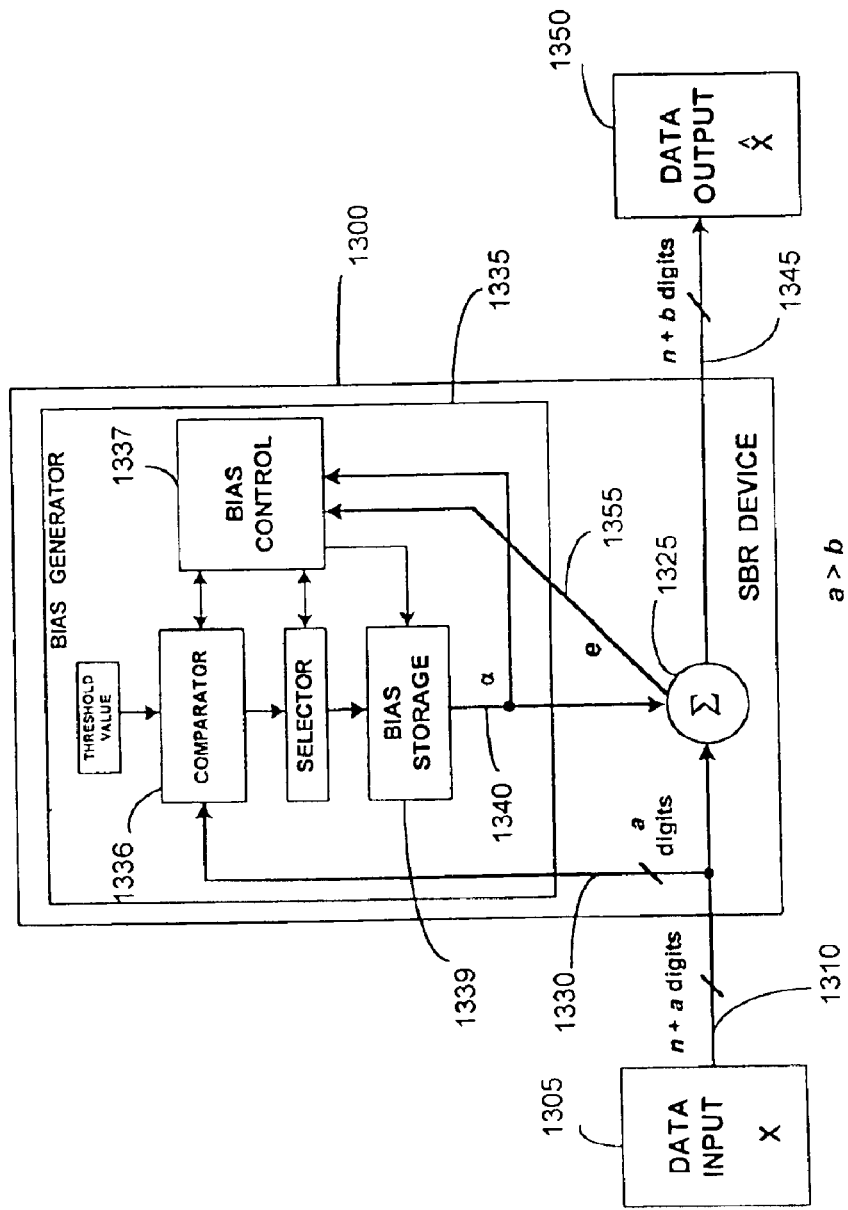
FIG. 13 is a fifth signal flow representation of still another embodiment of a selective bias rounding device, according to the present invention, illustrating managed control of a selectable bias.

FIG. 13 is yet another embodiment of an SBR device 1300 having a particular implementation of bias generator 1235, which is adapted to produce a selectable bias α 1340 by choosing among different SBR methods, responsive to predetermined signal characteristics. the Input signal X 1310 is produced by data source 1305, and received by SBR device 1300. Similar to FIG. 10, FIG. 11, and FIG. 12, input signal X 1310 is represented in an n+a digit format, where n represents the number of integer digits in the value of X and a represents the digits of the fractional portion 1330 of X. For this example, it is desired to transform input signal X 1310 into output signal X̂ 1345, which is represented in an n+b digit format, where n represents the number of integer digits in the value of X̂ and b represents the digits of the fractional portion of X, where a>b. It is also desired to preset the threshold value $f_t$ within comparator 1336 of selectable bias generator 1335 to indicate the presence of a half-value state, which, in a binary implementation would be (10 . . . 0), or in decimal would be $0.5_{10}$.

When signal 1310 is admitted to SBR device 1300, fractional portion a 1330, is evaluated within comparator 1336 to determine whether a half-value threshold rounding state exists. If it does, then comparator 1334 indicates the rounding state to bias control 1337 and enables bias storage 1339 in cooperation with bias control 1337. Responsive to the command from bias control 1337, bias storage assigns to selectable bias α 1340 values that are responsive to predetermined characteristics of input signal X 1310, selectable bias α 1340, output signal X̂ 1345, or error signal e 1355, or a combination thereof. Bias storage 1339 may assign values to selectable bias α 1340, that correspond with multiple SBR techniques, in which case, bias control 1337 also is adapted to assign values for selectable bias α 1340 according to those multiple SBR techniques. In addition to responding to the case where $a=f_t$, bias generator 1335 is capable of determining whether $a>f_t$ or $a<f_t$, adopting a separate response for each case.

Selectable bias α 1340, is then combined with signal 1310 in combiner 1325 to adjust the least significant precision bit of output signal X̂ 1345. Combiner 1325 also drops the least significant (a–b) bits of signal X̂ 1345, which are representative of the loss portion of the signal.

Figure 14:
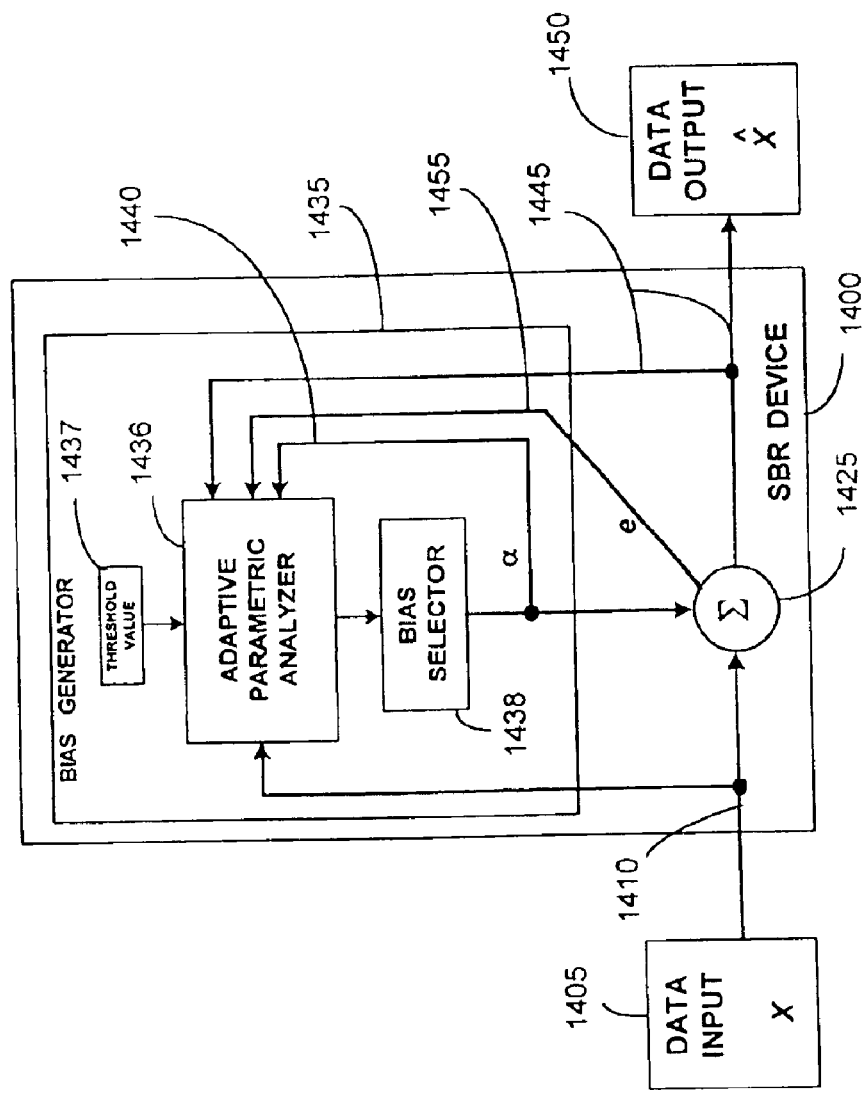
FIG. 14 is a sixth signal flow representation of still another embodiment of a selective bias rounding device, according to the present invention, illustrating adaptive parametric control of a selectable bias.

FIG. 14 illustrates yet another embodiment of SBR device 1400 according to the present invention in which bias generator 1445 employs an adaptive parametric analyzer 1436, which may be used to closely follow real-time statistical parameters of input signal X 1410, output signal X̂ 1445, selectable bias α 1440, precision reduction error signal e 1455, external controller 1470, and combinations thereof. In this particular embodiment of the present invention the desired threshold value $f_t$ can be maintained in threshold memory 1437. Once analyzer 1436 has evaluated one or more of signal X 1410, output signal X̂ 1445, selectable bias α 1440, and precision reduction error signal e, it provides a signal to bias selector 1438 which, in turn, assigns values to selectable bias α 1440 in response to the analyzed signals. In addition, analyzer 1436, bias selector 1438, or both, may assign values of selectable bias α 1440 at least in partial response to external controller 1470. Bias selector 1438 may assign values of selectable bias α 1440, that correspond with multiple SBR techniques responsive to information from parametric analyzer 1436. In addition to responding to the case where $a=f_t$, bias generator 1435 is capable of determining whether $a>f_t$ or $a<f_t$, adopting a separate response.

Figure 15:
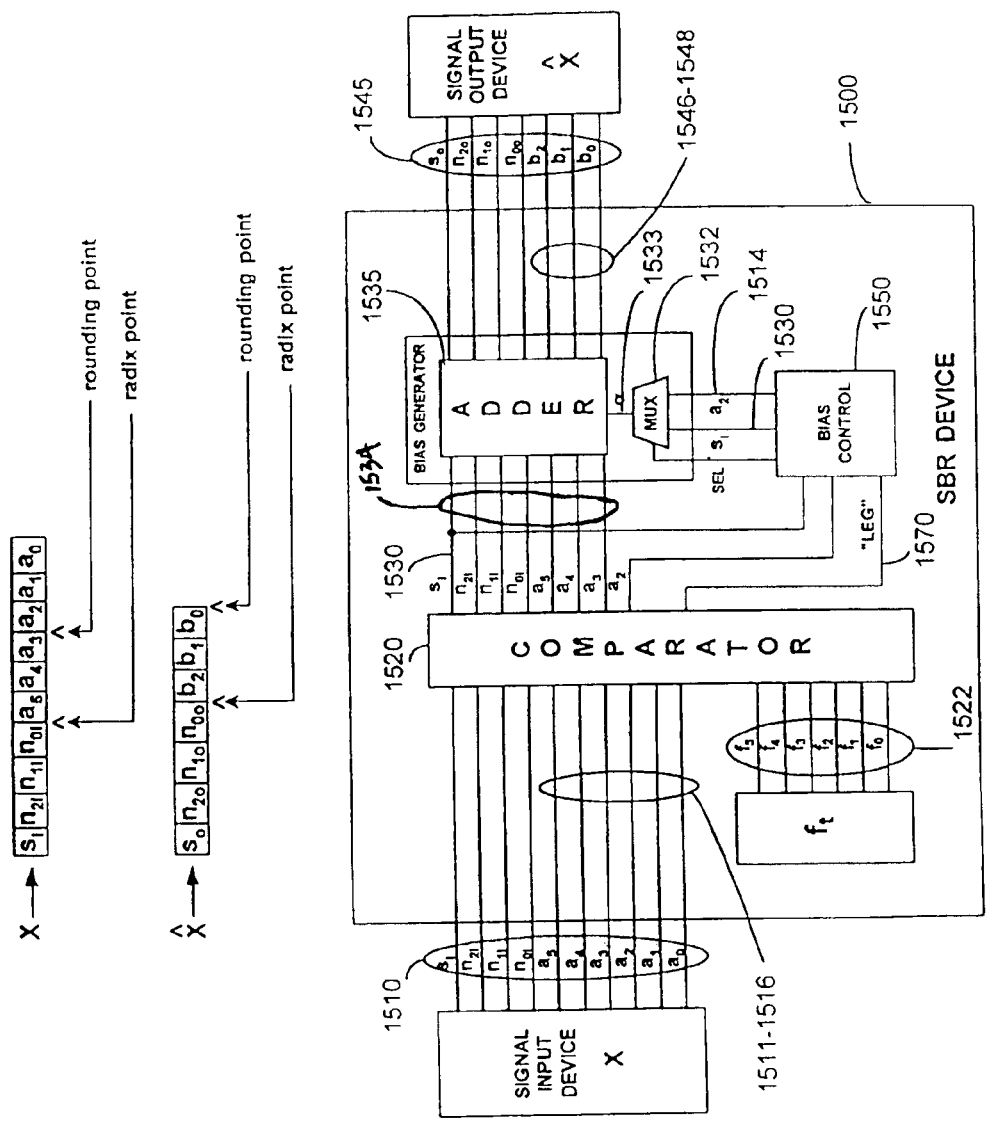
FIG. 15 is a VLSI system floor plan, illustrating a particular hardware implementation of managed control of a selectable bias.

FIG. 15 illustrates yet another embodiment of an SBR device 1500 according to the present invention. In this example, input signal X 1510 is represented in fixed point two's complement format. Signal X 1510 has a 6-bit fractional portion $a_5$–$a_0$ (1511–1516) which, when being rounded to output signal X̂ 1545, must be reduced to a 3-bit fractional portion $b_2$–$b_0$ (1546–1548) with rounding point 1590 conceptually following bit $a_3$ 1513.

Fractional bits $a_5$–$a_0$ 1511–1516 are compared in comparator 1520 with the preselected threshold value $f_t$ 1522, which value is maintained in a storage device (not shown). Where it is desired to implement a sign-bit rounding technique, similar to one discussed relative to method 800 and FIG. 8, the value of sign bit $s_t$ 1530 is selected by MUX 1532 to be combined with the precision portion 1534 of the output of comparator 1520, which constitutes the rounding operand. If the sign-bit technique is selected by bias control 1550, then when input signal X 1510 has positive polarity, then the value of binary '0' becomes selectable bias α 1533 which is combined with bit $a_3$ 1513. On the other hand, when input signal X 1510 has negative polarity, then the value of binary '1' becomes selectable bias α 1533 which is combined with bit $a_3$ 1513. If the current rounding state is not the threshold rounding state, then bit $a_2$ 1514, can be selectively added to bit $a_3$ 1513 under the direction of bias controller 1550, in a manner consistent with the rounding technique chosen (e.g., RTZ, RTN, RTC, RTF, and RTE). Adder 1535 is designed with a seven-bit input and seven bit output, thus inherently dropping loss bits $a_2$–$a_0$ (1514–1516), and producing signed output signal 1545 with 3 bit fractional portion $b_2$–$b_0$ 1548.

Bias controller 1550 can select from among multiple SBR techniques as well as multiple prior art rounding techniques in order to effect precision reduction responsive to input signal 1510, output signal 1545, a model of the precision reduction error as programmed into bias controller 1550, and so forth. For example, where it is desired that bias controller 1550 assign different values to selectable bias α 1533 depending upon whether comparator control signal 1570 ("LEG" signal) indicates whether $a<f_t$, $a=f_t$, or $a>f_t$, and bias controller 1550 selects the precision reduction techniques for which the controller 1550 has been programmed.

Figure 16:
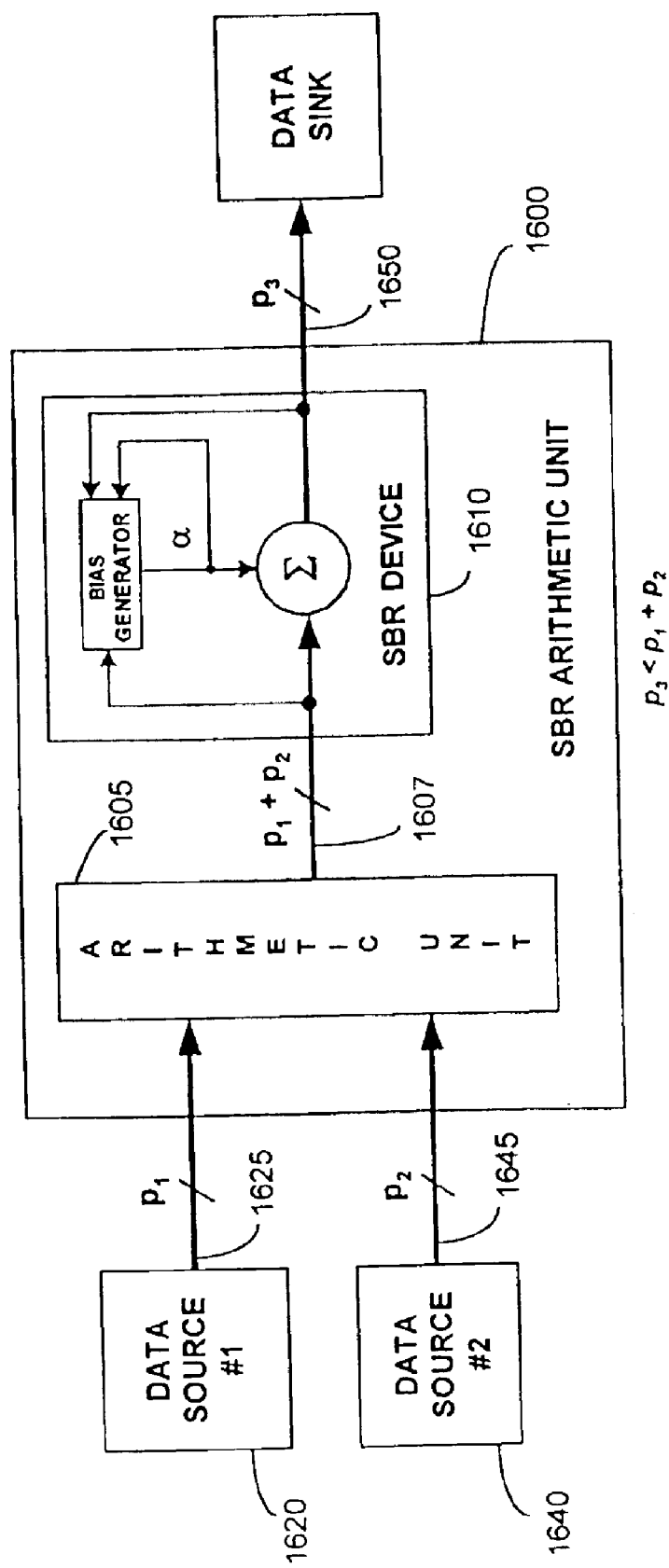
FIG. 16 is a seventh signal flow representation of an SBR arithmetic unit, according to the present invention, in which a selectable bias rounding device is coupled to a standard arithmetic device.

FIG. 16 shows an improved SBR arithmetic unit 1600 which combines an existing arithmetic unit 1605 with a SBR device 1610. Such an arithmetic unit could be, for example, an arithmetic logic device 1605 whose output 1607 produces a datum with more precision, or more digits, than is desired. SBR device 1610 can be used both to reduce the precision of signal 1607, and to compensate for precision reduction error bias. Also, device 1610 can be employed to compensate for undesirable biases and offsets that may be introduced by data source 1620 and data source 1640. Furthermore, device 1610 can be adapted to compensate for computational errors which arise from the operations of arithmetic unit 1605, or to impart a desired offset upon output signal 1650.

Arithmetic unit 1605 can be, for example, a multiplier, an adder, an accumulator, or other arithmetic device. In the example shown in FIG. 16, arithmetic unit 1605 can be a multiplier which receives signal 1625, from data source #1 1620, having $p_1$ digits, and multiplies signal 1625 with signal 1645 from data source #2 1640, having a precision of $p_2$ digits. Arithmetic unit 1607 outputs signal 1607 having precision of $p_1+p_2$ digits. SBR device 1610 can be advantageous where it is desired to provide data sink 1660 with reduced precision signal 1650, for example, with $p_3$ bits precision, where $p_3<p_2+P_1$.

Depending upon the application at hand, a skilled artisan would be able to implement SBR device 1610, for example, using one of those illustrated in FIGS. 10–15, to produce the desired results, or another suitable hardware design implementing methods according to the present invention.

Figure 17:
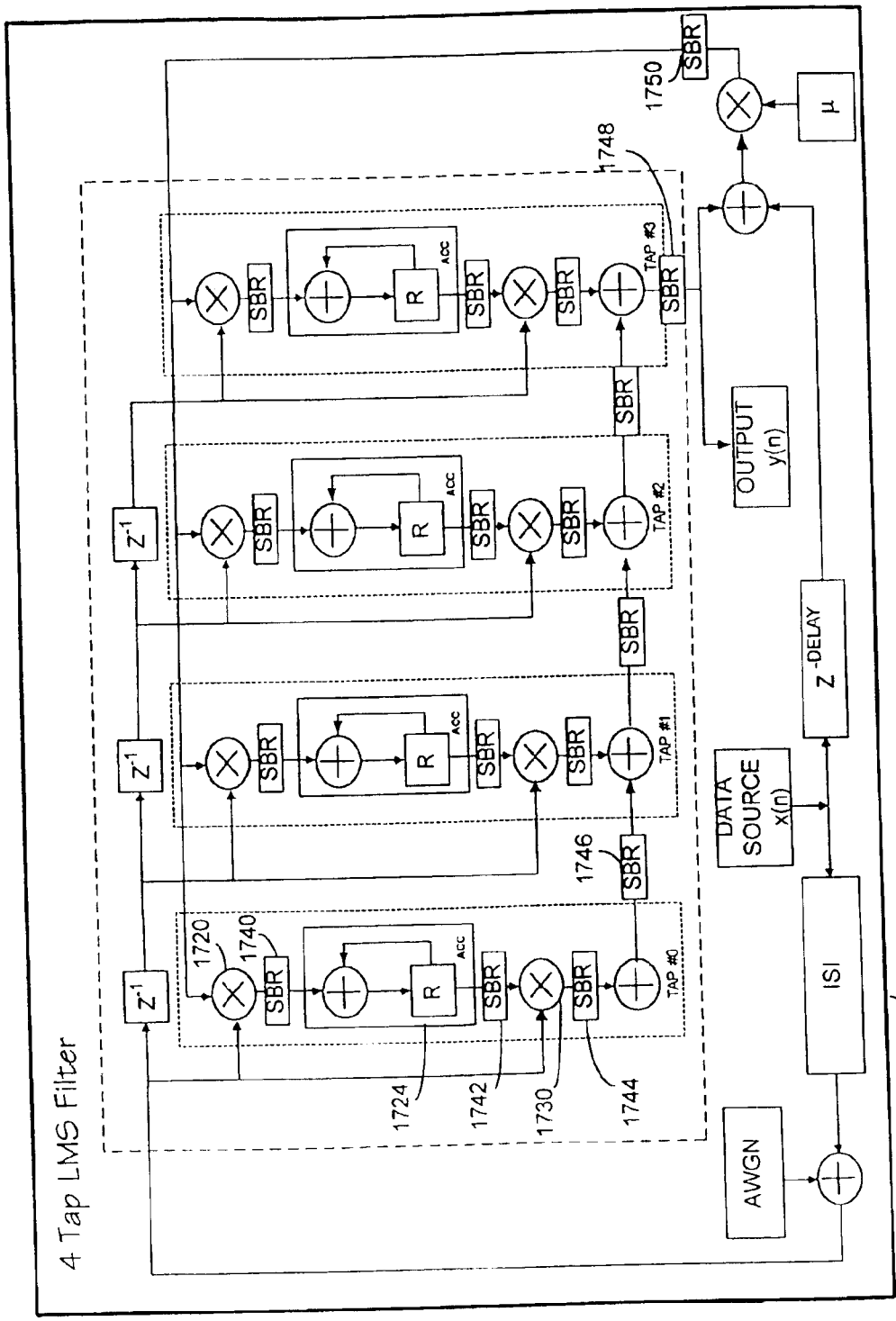
FIG. 17 is a generalized schematic of a 4-tap LMS adaptive filter, according to the present invention, having selectable bias rounding devices integrated therein for precision reduction management.

In FIG. 17, four-tap LMS adaptive filter 1700 according to the present invention is illustrated. Overall, filter 1700 demonstrates a well-known general architecture for LMS adaptive filters. Filter 1700 includes FIR filter taps, as illustrated by filter tap 1718, which includes a number of elements that tend to produce results with increased precision, which may need to be reduced prior to the datum entering a subsequent processing element. Such elements can include multipliers 1720, 1730, adder 1732, and accumulator 1724. Each of these elements tend to require greater precision on their respective outputs, and the judicious placement of SBR devices 1740, 1742, 1744, 1746 in the data path following selected multipliers 1720, 1730, adder 1732, and accumulator 1724 can be advantageous for managing, or substantially eliminating, precision reduction errors throughout filter 1700. Also, SBR devices 1748, 1750, 1752 may be employed at other points within LMS filter 1700, where it is desirable to substantially eliminate precision reduction errors. Furthermore, composite elements such as a shifter, multiplier-accumulator (MAC), or other computational device may benefit from having certain implementations of the present invention coupled thereto. Finally, it may be desirable to provide SBR arithmetic units which advantageously combine an existing precision-increasing arithmetic element with an embodiment of the precision reduction invention herein.

Many alterations and modifications may be made by those having ordinary skill in the art without departing from the spirit and scope of the invention. Therefore, it must be understood that the illustrated embodiments have been set forth only for the purposes of example, and that it should not be taken as limiting the invention as defined by the following claims. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A method for rounding a first two's complement fixed point datum X represented by a sign bit $s_i$, n first integer bits, and a first fractional bits, where X includes a precision portion including at least the n first integer bits and b first fractional bits, and a loss portion including (a–b) first fractional bits, the method comprising:

comparing at least a portion of the a first fractional bits with a preselected threshold value;

if the comparison returns a first result, adding the sign bit $s_i$ to the least significant bit of the precision portion of X;

if the comparison returns a second result, adding the most significant bit of the loss portion of X to the least significant bit of the precision portion of X; and returning $\hat{X}$ based on the addition calculation, wherein $\hat{X}$ includes at least n second integer bits and b second fractional bits.

2. The method of claim 1, wherein $S_i$ indicates whether X is a positive or negative number, and wherein X being a positive number is substantially equiprobable to X being a negative number.

3. The method of claim 1, wherein $\hat{X}$ further includes a sign bit $s_o$.

4. The method of claim 1, wherein the comparing includes comparing the loss portion of X with the preselected threshold value.

5. The method of claim 4, wherein the comparison returns the first result if the most significant bit of the loss portion has a value of "1" and any subsequent bits of the loss portion has a value of "0."

6. The method of claim 1, wherein the first result indicates that the compared first fractional bits equal the threshold value.

7. The method of claim 1, wherein the second result indicates that the compared first fractional bits do not equal the threshold value.

8. A computer program product recorded on a computer readable medium for rounding a first two's complement fixed point datum X represented by a sign bit $s_i$, n first integer bits, and a first fractional bits, where X includes a precision portion including at least the n first integer bits and b first fractional bits, and a loss portion including (a–b) first fractional bits, the computer program product comprising:

a computer readable program code comparing at least a portion of the a first fractional bits with a preselected threshold value;

if the comparison returns a first result, a computer readable program code adding the sign bit $s_i$ to the least significant bit of the precision portion of X;

if the comparison returns a second result, a computer readable program code adding a most significant bit of the loss portion of X to the least significant bit of the precision portion of X; and a computer readable program code returning $\hat{X}$ based on the addition calculation, wherein $\hat{X}$ includes at least n second integer bits and b second fractional bits.

9. The computer program product of claim 8, wherein $S_i$ indicates whether X is a positive or a negative number, and wherein X being a positive number is substantially equiprobable to X being a negative number.

10. The computer program product of claim 8, wherein $\hat{X}$ further includes a sign bit $s_o$.

11. The computer program product of claim 8, wherein the computer readable program code for the comparing includes computer readable program code comparing the loss portion of X with the preselected threshold value.

12. The computer program product of claim 11, wherein the comparison returns the first result if the most significant bit of the loss portion has a value of "1" and any subsequent bits in the loss portion has a value of "0."

13. The computer program product of claim 8, wherein the first result indicates that the compared first fractional bits equal the threshold value.

14. The computer program product of claim 8, wherein the second result indicates that the compared first fractional bits do not equal the threshold value.

15. The computer program product of claim 8, wherein a>b.

16. A rounding device for rounding a first two's complement fixed point datum X represented by a sign bit $s_i$, n first integer bits, and a first fractional bits, where X includes a precision portion including at least the n first integer bits and b first fractional bits, and a loss portion including (a–b) first fractional bits, the rounding device comprising:

means for comparing at least a portion of the a first fractional bits with a preselected threshold value;

if the comparison returns a first result, means for adding the sign bit $s_i$ to the least significant bit of the precision portion of X;

if the comparison returns a second result, means for adding a most significant bit of the loss portion of X to the least significant bit of the precision portion of X; and means for returning $\hat{X}$ based on the addition calculation, wherein $\hat{X}$ includes at least n second integer bits and b second fractional bits.

17. The rounding device of claim 16, wherein $\hat{X}$ further includes a sign bit $s_o$.

18. The rounding device of claim 16, wherein the means for comparing includes means for comparing the loss portion of X with the preselected threshold value.

19. The rounding device of claim 18, wherein the comparison returns the first result if the most significant bit of the loss portion has a value of "1" and any subsequent bits in the loss portion has a value of "0."

20. The rounding device of claim 16, wherein the first result indicates that the compared first fractional bits equal the threshold value.

21. The rounding device of claim 16, wherein the second result indicates that the compared first fractional bits do not equal the threshold value.

22. The rounding device of claim 16, wherein $s_i$ indicates whether X is a positive or a negative number, and wherein X being a positive number is substantially equiprobable to X being a negative number.

* * * * *